United States Patent
Park

(10) Patent No.: US 7,085,665 B2
(45) Date of Patent: Aug. 1, 2006

(54) METHOD FOR AUTOMATICALLY COMPENSATING FOR UNBALANCE CORRECTION POSITION AND CORRECTION AMOUNT IN BALANCING MACHINE

(76) Inventor: Kye Jung Park, 2014-98, Daeinyung2.8-dong, Nan-gu, Taegu 705-032 (KR)

(*) Notice: Subject to any disclaimer, the term of this patent is extended or adjusted under 35 U.S.C. 154(b) by 93 days.

(21) Appl. No.: 10/511,956

(22) PCT Filed: Oct. 31, 2002

(86) PCT No.: PCT/KR02/02028

§ 371 (c)(1),
(2), (4) Date: Oct. 18, 2004

(87) PCT Pub. No.: WO03/090329

PCT Pub. Date: Oct. 30, 2003

(65) Prior Publication Data

US 2005/0119847 A1 Jun. 2, 2005

(30) Foreign Application Priority Data

Apr. 19, 2002 (KR) .......................... 10-2002-21477

(51) Int. Cl.
*G06F 19/00* (2006.01)
*G01M 1/16* (2006.01)
(52) U.S. Cl. ........................................ 702/105; 73/462
(58) Field of Classification Search ................ 702/105, 702/102–104; 73/462; 118/669; 318/676
See application file for complete search history.

(56) References Cited

U.S. PATENT DOCUMENTS

| | | | |
|---|---|---|---|
| 3,259,823 A * | 7/1966 | Miller | 318/676 |
| 4,480,471 A * | 11/1984 | Kogler et al. | 73/462 |
| 4,868,762 A * | 9/1989 | Grim et al. | 700/279 |
| 5,199,992 A * | 4/1993 | Hines et al. | 118/669 |
| 5,235,854 A * | 8/1993 | Hines et al. | 73/462 |
| 5,505,083 A * | 4/1996 | Hines et al. | 73/462 |
| 2005/0119847 A1* | 6/2005 | Park | 702/105 |

* cited by examiner

*Primary Examiner*—Michael Nghiem
*Assistant Examiner*—Victor J. Taylor
(74) *Attorney, Agent, or Firm*—JHK Law; Joseph Hyosuk Kim

(57) ABSTRACT

Disclosed is a method for automatically compensating for an unbalance correction position and an unbalance correction amount in a balancing machine. The method involves an unbalance testing procedure, an initial unbalance amount determining procedure, a counting procedure, a good-quality determining procedure, an angular deviation measuring procedure, an angular deviation range determining procedure, and an unbalance correction position and amount compensating procedure in order to automatically compensate for the unbalance correction position and amount of a rotor, based on the unbalance correction amount of a previously-corrected thereby achieving an optimum unbalance correction in spite of the fact that there may be errors in unbalance correction position and amount. The automatic compensation method further involves a correction amount re-setting procedure, a current condition displaying procedure, a procedure for automatically stopping the balancing machine, a basic data storing procedure, and an automatic basic data recovering procedure.

9 Claims, 20 Drawing Sheets

Unbalance Correction Amount Graph

6-Axis Balancing Machine

2- Axis Balancing Machine

Unbalance Correction Amount Graph

Examples of Erroneous Unbalance Correction Caused by
Erroneous Setting of Cutting Tool ● : Unbalance Amount Before Unbalance Correction ● : Unbalance Amount After Unbalance Correction

Fig. 5C
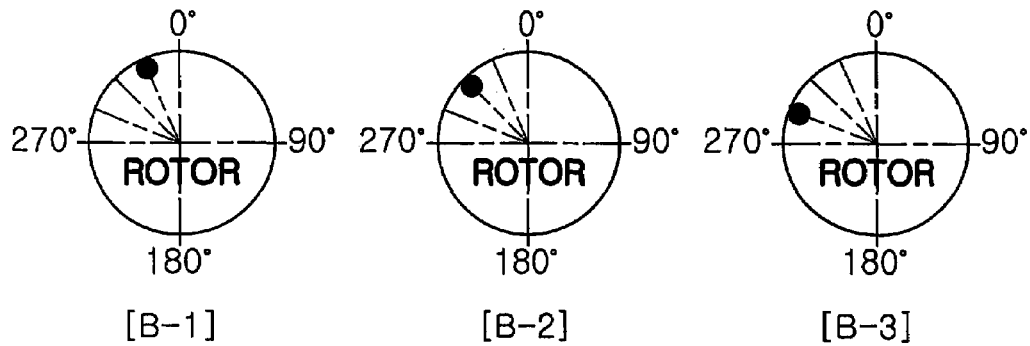
Angular Errors (Angular Deviations) from Heavy-Weight Reference Point of 0° ; B-1 < B-2 < B-3
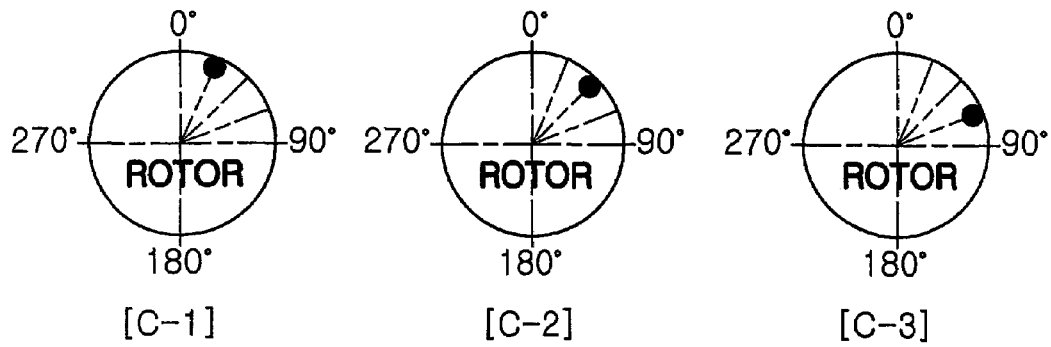
Angular Errors (Angular Deviations) from Heavy-Weight Reference Point of 0° ; C-1 < C-2 < C-3

Fig. 5D
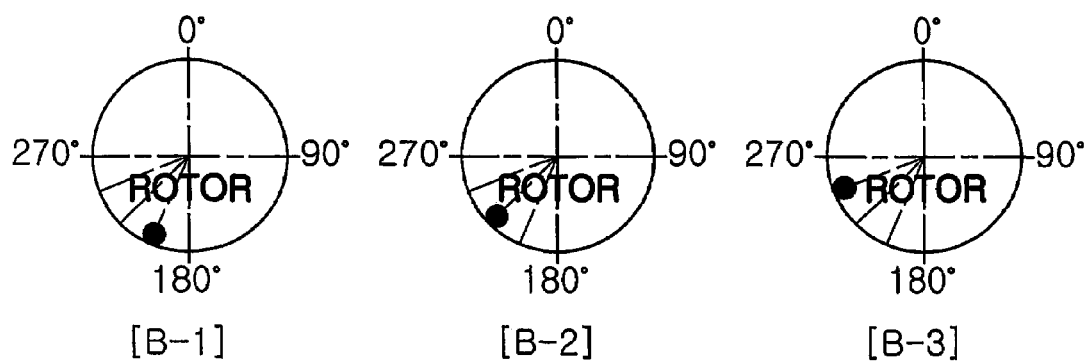
Angular Errors (Angular Deviations) from Light-Weight
Reference Point of 180° : D-1 < D-2 < D-3
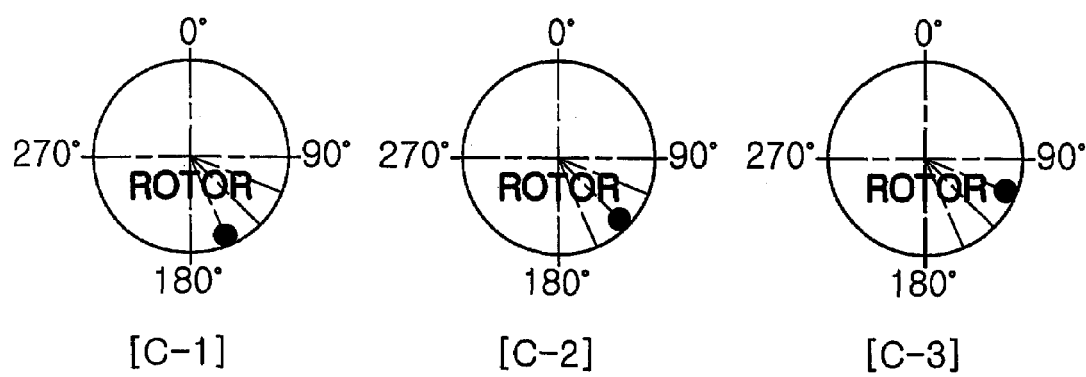
Angular Errors (Angular Deviations) from Light-Weight
Reference Point of 180° : E-1 < E-2 < E-3

Unbalance Correction Amount Graph

Unbalance Correction Amount Graph

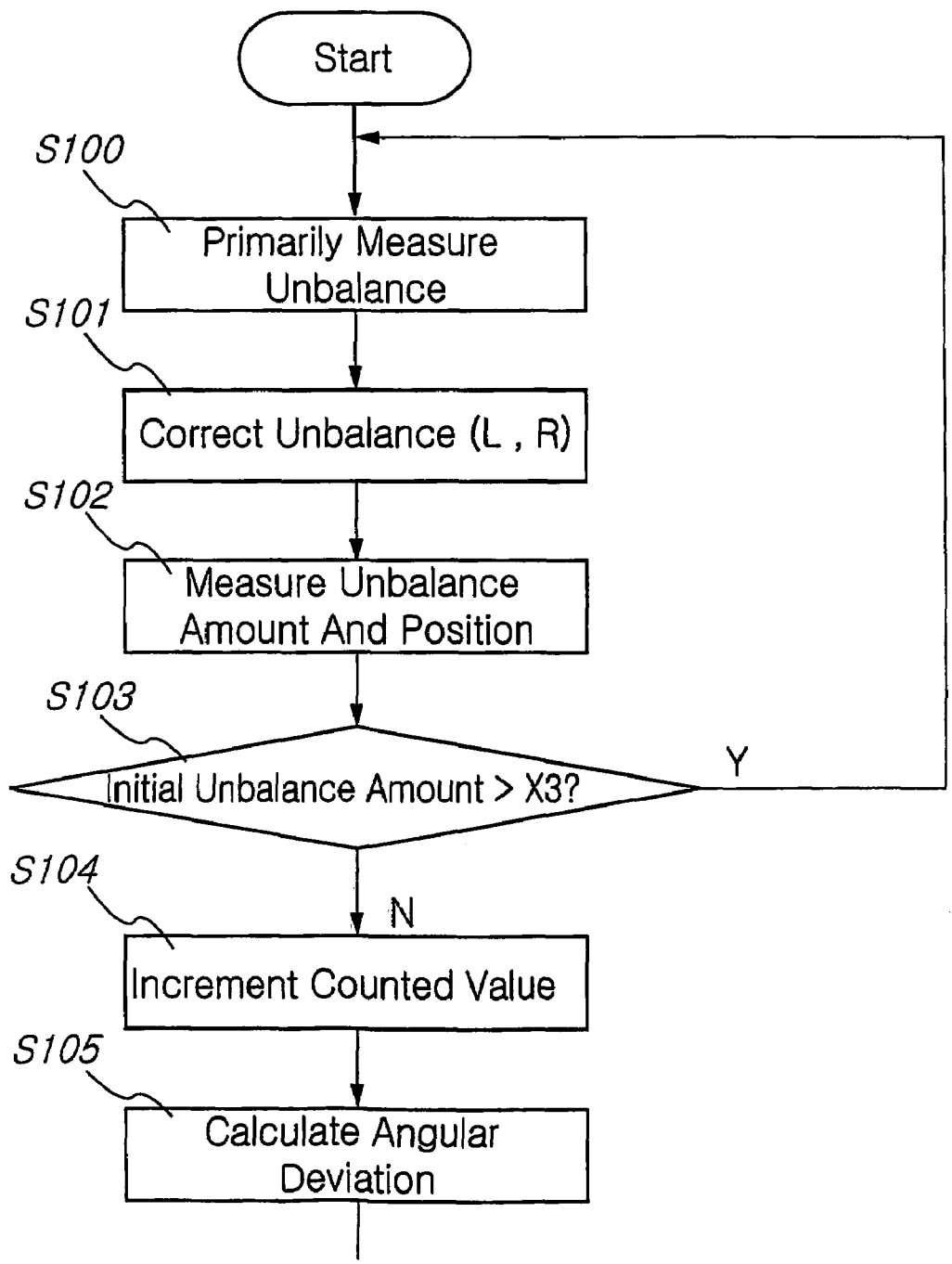
Fig. 8A-a

Fig. 8A-b
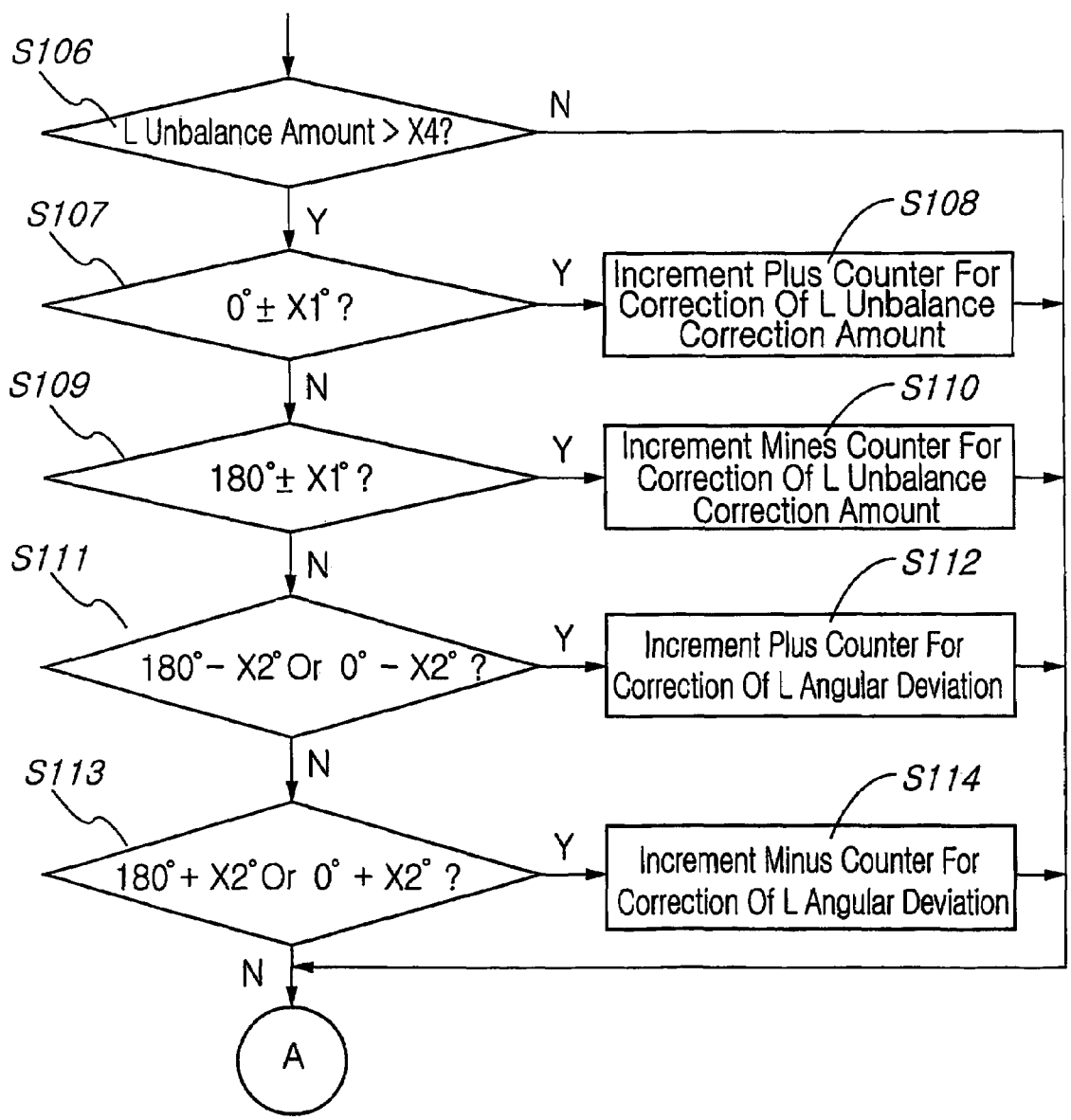

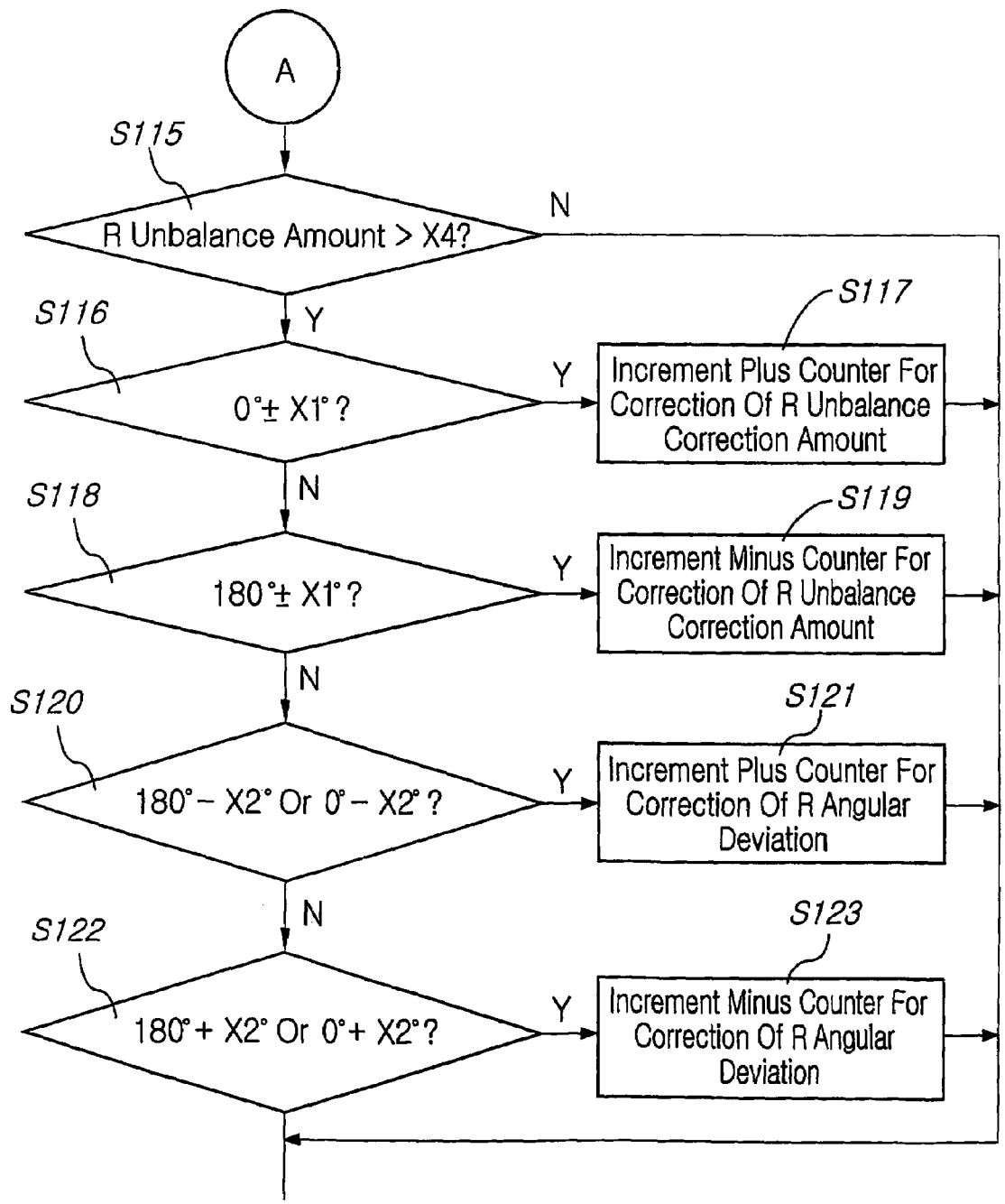
Fig. 8B-a

Fig. 8B-b
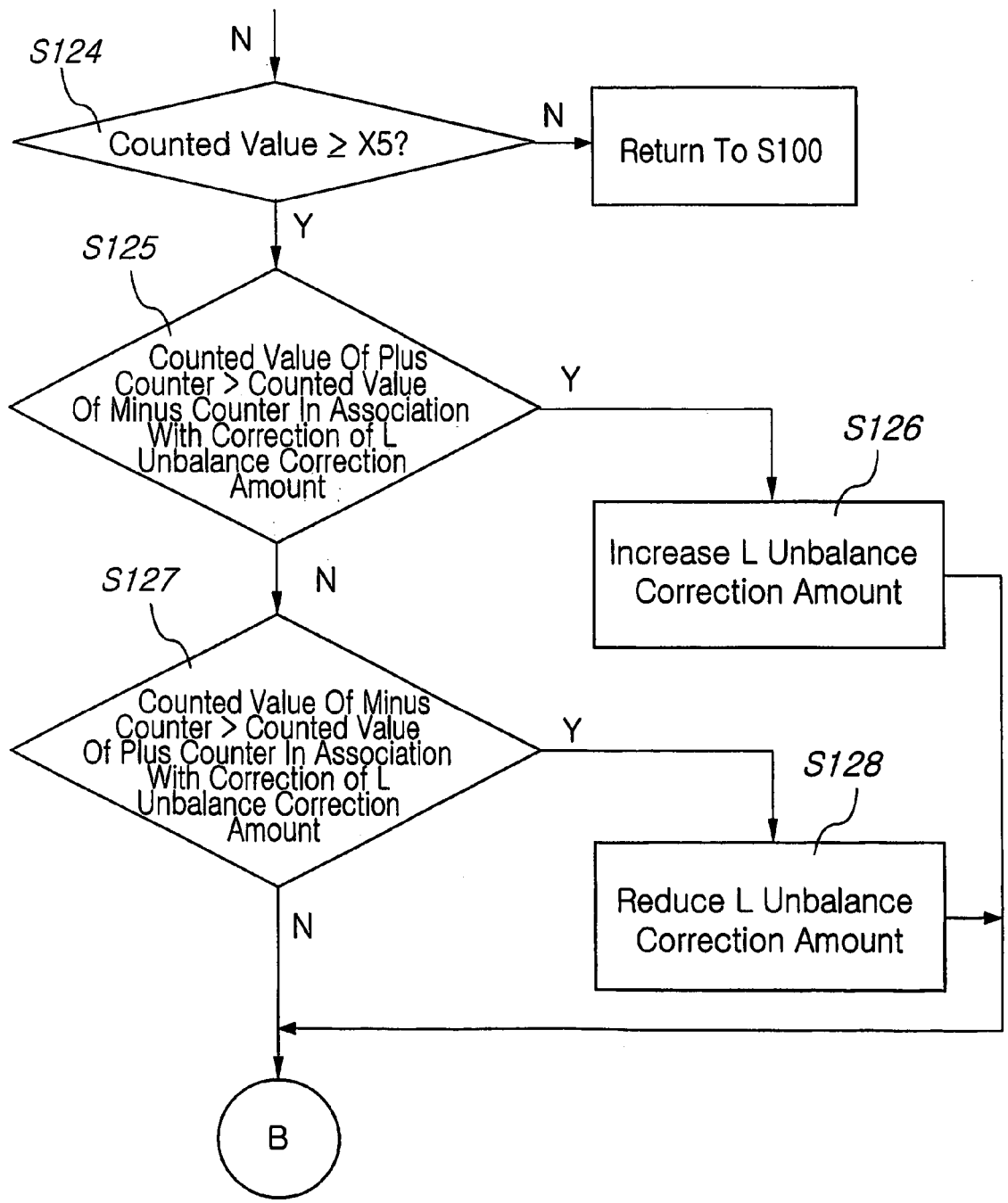

Fig. 8C-a
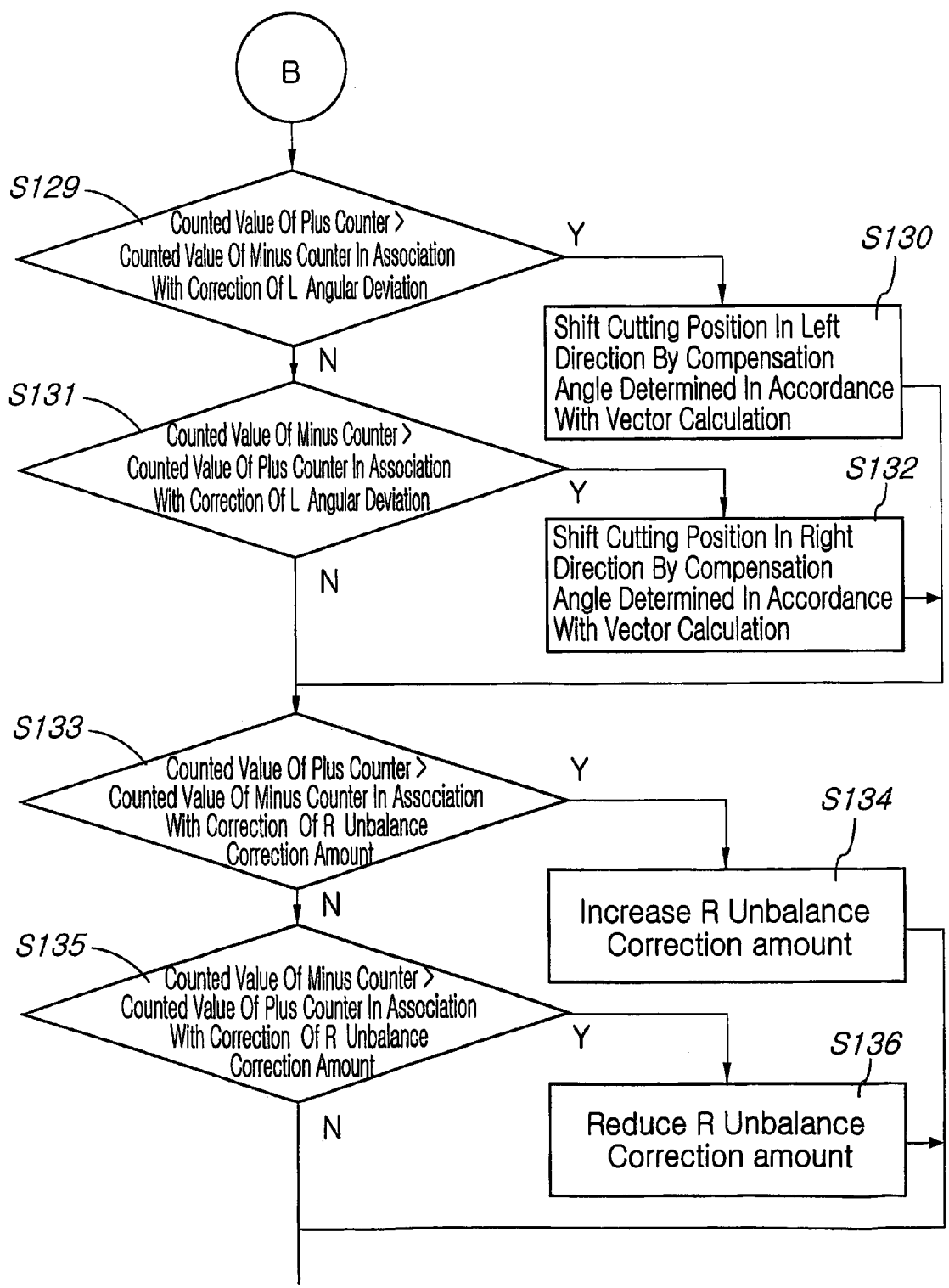

Fig. 8C-b
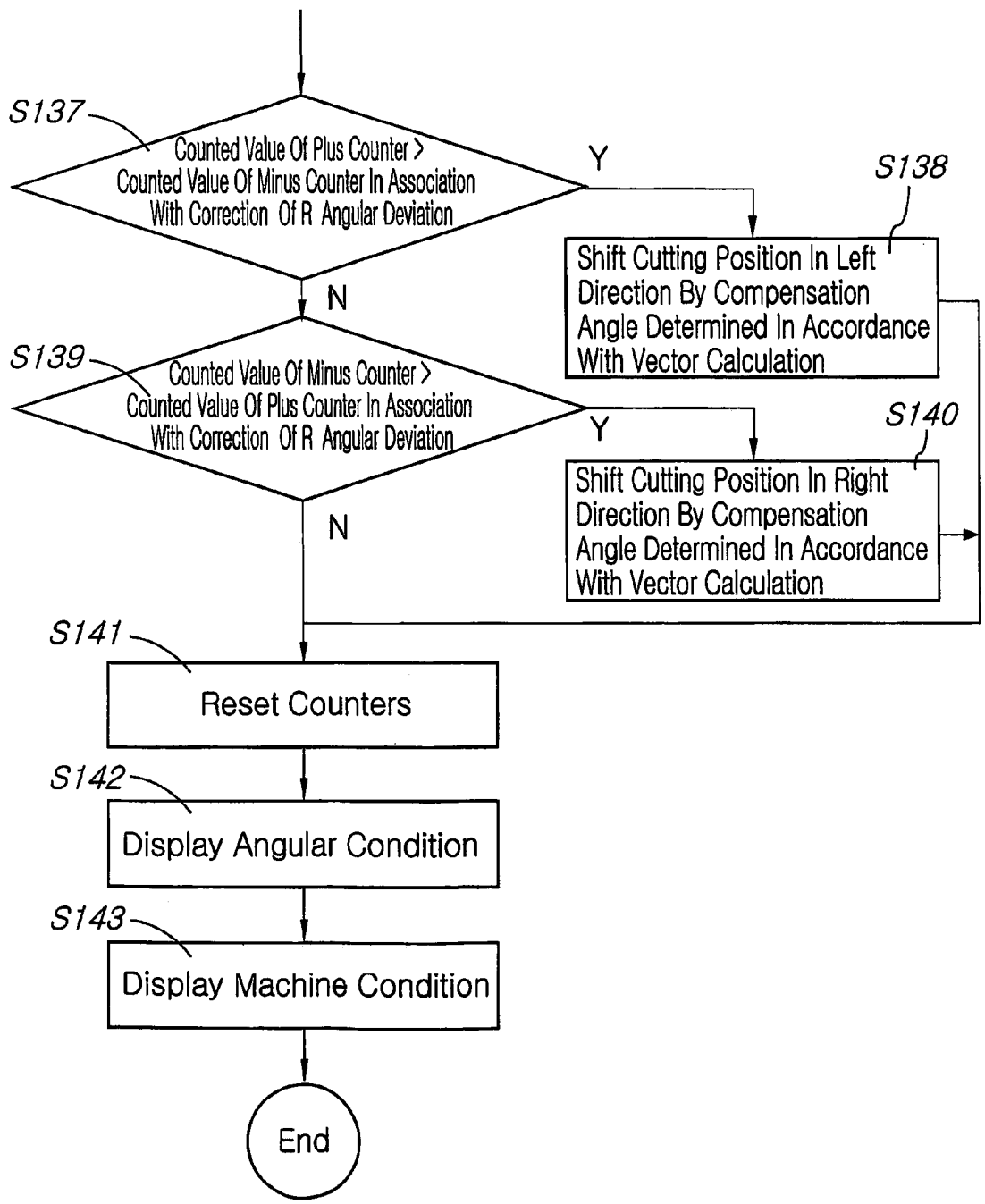

METHOD FOR AUTOMATICALLY COMPENSATING FOR UNBALANCE CORRECTION POSITION AND CORRECTION AMOUNT IN BALANCING MACHINE

TECHNICAL FIELD

The present invention relates to a method for automatically compensating for an unbalance correction position and correction amount in a balancing machine, and more particularly to a method for automatically compensating for an unbalance correction position and correction amount in a balancing machine, which is capable of greatly reducing the rate of products, for example, rotors, having a poor quality due to an erroneous unbalance correction, while achieving a great improvement in productivity.

BACKGROUND ART

Generally, a rotor such as an armature, which rotates about an axis, can be avoided from vibrating during its rotation only under the condition in which the mass of the rotor is uniformly distributed around the axis. In such a rotor, however, there is weight unbalance, that is, an unbalanced portion, with respect to the axis of the rotor due to various reasons such as machining errors, and unbalanced molecular arrangement.

Since such an unbalanced portion causes the rotor to vibrate, it is necessary to make the center of weight of the rotor coincide with the axis of the rotor by appropriately eliminating the unbalance amount of the unbalanced portion, that is, appropriately increasing or reducing the weight of the unbalanced portion. In this connection, balancing machines have been proposed. Balancing machine is an apparatus for detecting the unbalance position and unbalance amount of a rotor, and correcting the unbalance of the rotor based on the detected result, thereby making the center of weight of the rotor coincide with the axis of the rotor. Such a balancing machine operates in an additive correction fashion or in a subtractive correction fashion in accordance with an unbalance correction method used therein. In accordance with the additive correction fashion, a desired balance is obtained by adding a weight to a smaller mass portion. In accordance with the subtractive correction fashion, a desired balance is obtained by cutting a desired amount from a lager mass-portion.

The configuration of a balancing machine operating to perform a subtractive unbalance correction will now be described in conjunction with an armature with reference to FIGS. 1a to 2b.

FIGS. 1a and 1b are perspective views respectively illustrating general armatures. FIG. 2a is a plan view illustrating a conventional 6-axis armature balancing machine. FIG. 2b is a plan view illustrating a conventional 2-axis armature balancing machine. In FIGS. 1a to 2b, identical elements are denoted by the same reference numeral in order to avoid a repeated description thereof.

First, the configuration of the general armature will be described with reference to FIGS. 1a and 1b. The armature, which is denoted by the reference numeral 1, includes a shaft 2, a laminated core 3 fixedly mounted around the shaft 2, wire coils 5 wound along slots 4 formed at the core 3, and a commutator 6 mounted to the shaft 2 near one end of the shaft 2. When the armature 1, which is the rotor of a motor, is unbalanced about its rotating axis in terms of weight, it may vibrate during its rotation.

For this reason, the balance accuracy of the armature 1 has a close relation with the performance of the motor using the armature 1 as its rotor. Since recent industrial developments cause an increased demand for motors having a superior performance, more accurate armatures having a higher balance accuracy have been required.

Now, the configuration of the conventional 6-axis armature balancing machine for measuring the balance of the above described armature, and machining the armature based on the measured result, will be described with reference to FIG. 2a. As shown in FIG. 2a, the 6-axis armature balancing machine includes a lift unit L for supplying the armature 1 to be subjected to a measuring process, and discharging the measured armature 1 to be subjected to a machining process, and a first balance measuring unit B1 for measuring unbalance amounts and positions of the armature 1 at opposite axial portions, that is, left and right axial portions, of the core 3 in the armature 1, respectively. The armature balancing machine also includes a first cutting unit C1 for removing the unbalance amount of the armature 1 measured by the first balance measuring unit B1 at the left portion of the core 3, in accordance with a cutting process using a cutting tool, a rotating unit R for rotating the armature 1 to position the right unbalanced portion of the armature 1 at a cutting point, and a second balance measuring unit B2 for re-measuring a possible unbalance amount of the armature 1 subjected to the cutting process at its left and right unbalanced portions. The armature balancing machine further includes an index device I for feeding the armature 1 to each of the units L, B1, C1, R, C2, and B2 while being vertically movable, and a control unit (not shown) for detecting the unbalance amounts and positions of the armature 1 based on signals outputted from the balance measuring units B1 and B2, and outputting operation control signals, generated based on the detected results, to the remaining units L, C1, R, and C2, thereby compensating for the unbalance of the armature 1. The index device I includes: a plurality of index arms having the same number as that of the above described units, and a finger unit 20.

Each of the balance measuring units B1 and B2 includes a servo motor or stepping motor having a pulley to which the armature 1 is connected via a belt, and a balance measuring section arranged near the armature 1 to measure the unbalance amount and position of the armature 1. The control unit rotates the armature 1 at a predetermined RPM by outputting pulses to the drive motor, based on a vibration signal generated through a vibration measuring sensor alone or together with a reference point sensor. During the rotation of the armature 1, the control unit detects the position (angle) and unbalance amount of each unbalanced portion in the armature 1 through a calculation circuit and a calculation program. The calculation circuit and program may be of various types, for example, an AIFA WATT METRIC type, a FILT type, an FFT type, a WATT METRIC type, or a synchronous rectification type.

The control unit also generates operation control signals based on signals outputted from the balance measuring units B1 and B2, and outputs those operation control signals to the lift unit L, cutting units C1 and C2, and rotating unit R, respectively. Under the control of the control unit, respective unbalanced portions of the armature 1 are positioned at cutting points of cutting tools included in the cutting units C1 and C2 by the index device I. When the armature 1 is fed to the first cutting unit C1 or the second cutting unit C2 by the index device I, its unbalanced portion is cut by the associated cutting unit in accordance with a cut depth and axial cutting length determined by a predetermined unbalance amount.

The configuration of the conventional 2-axis armature balancing machine will be described with reference to FIG. 2b. As shown in FIG. 2b, the 2-axis armature balancing machine includes a balance measuring unit B3 for measuring respective unbalance amounts and positions of the armature 1 at opposite axial portions, that is, left and right axial portions, of the core 2 in the armature 1 fed by a conveyor belt, a cutting unit C3 for cutting the armature 1, based on each unbalance amount measured by the balance measuring unit B3, and a rotating unit R3 for rotating the armature 1, based on each unbalance position measured by the balance measuring unit B3. The 2-axis armature balancing machine also includes an index device I3 for feeding the armature 1 completing its unbalance test from the balance measuring unit B3 to the cutting unit C3, upwardly moving, rotating 180°, and then downwardly moving the cutting unit C3 on the cutting unit C3 for cutting the left and right portions of the armature 1, and feeding again the corrected armature 1 from the cutting unit C3 to the balance measuring unit B3. The 2-axis armature balancing machine further includes a control unit for outputting operation control signals to the rotating unit R3, cutting unit C3, and index device I3 in order to achieve an unbalance correction based on the signal outputted from the balance measuring unit B3. In the 2-axis armature balancing machine, the armature 1, which has vertically moved by the index device I3, may be 180° rotated without being downwardly moved. That is, the armature 1 can be rotated at a fixed position by the rotating unit R3.

The cutting amount in the cutting process is determined by the upward movement length of a blade included in the cutting tool, and the axial forward and backward movement length of the blade. The upward movement length of the blade, that is, the cutting depth, and the axial forward and backward movement length, that is, the axial cutting length, are set based on the unbalance amount of the armature by the user. Examples of this setting are illustrated in FIG. 3.

FIG. 3 shows graphs depicting an unbalance correction amount varying depending on the unbalance amount. As indicated by the graph denoted by the reference numeral "1", the cutting depth and axial cutting length are set based on each of sampled unbalance amounts. For example, the unbalance correction amount may be 0.1 mm for an unbalance amount of 50 mg, and 0.2 mm for an unbalance amount of 100 mg. When a measured unbalance amount is determined to be within a range between the set unbalance amounts, the associated cutting depth and axial cutting length are determined by proportionally estimating them based on the set values.

FIGS. 2a to 3 illustrate an example in which a subtractive unbalance correction is carried out. In the case of an additive unbalance correction, the balancing machine automatically discharges a weight determined based on the predetermined unbalance amount, and attaches the discharged weight to the rotor at its unbalance position. In order to discharge a desired weight amount, discharge time and pressure are adjusted.

Although the unbalance correction by the balancing machine has been described as being applied to armatures, it may be applicable to any objects requiring balance correction. Since these objects may be appreciated by those skilled in the art, no detailed description thereof will be given.

However, the above described balancing machine may involve errors in unbalance correction position and amount due to an erroneous setting of the cutting tool, a linear or non-linear abrasion of the blade edge in the cutting tool occurring during its use due to an erroneous setting of the cutting tool, an angular error generated during the rotation of the index device, vertical and axial mechanical tolerances occurring during the vertical and axial movements of the index device, a mechanical tolerance caused by a temperature difference, an erroneous measurement of unbalance angle and amount occurring due to a variation in measurement condition caused by an abrasion of the belt or drive pulley, or erroneous unbalance correction position and amount caused by various errors generated due to a variation in the temperature characteristics of various electronic elements included in the control unit. Examples of such errors will now be described with reference to FIGS. 3 to 5d.

Although an unbalance amount and an unbalance correction amount according to the unbalance amount should be linearly proportional to each other, as indicated by the graph 1 of FIG. 3, their practical relation is non-linear, as indicated by graphs 2 and 3 in FIG. 3. Such a non-linearity results from the above described causes of various unbalance correction errors.

As described above, unbalance correction errors may be generated due to an erroneous setting of the cutting tool. For example, the cutting tool should be set in such a fashion that the blade edge 9 and the armature 1 are concentric, as shown in a part "a" of FIG. 4. However, where the blade edge 9 and the armature 1 are eccentric, as shown in a part "b" or "c" of FIG. 4, that is, an erroneous setting of the cutting tool occurs, the unbalance correction is not achieved at a correct position, as indicated by black portions in the parts "a" to "c" of FIG. 4.

Where there is no error in association with the unbalance correction position, as shown in the part "a" of FIG. 4, the corrected position is at 0° or 180° under the condition in which the initial unbalance position is 0° (FIG. 5a), as shown in FIG. 5b. In the case of the armature having an unbalance at a position indicated by a black circle in the part "A-1" of FIG. 5b, its unbalance correction is accurately made at a position of 0°. When the unbalance correction amount is less than the unbalance amount in the case shown in the part "A-1" of FIG. 5b, there is an unbalance amount remaining at the position of 0° after the unbalance correction, as shown in the part "A-2" of FIG. 5b. On the other hand, when the unbalance correction amount is more than the unbalance amount, there is an unbalance amount remaining at a position opposite to the initial unbalance position after the unbalance correction, as shown in the part "A-3" of FIG. 5b. In this case, the initial unbalance position is shifted by an angle of 180°. In either case, the unbalance correction amount should be adjusted because although the unbalance correction position is correct, there is an error in the unbalance correction amount.

Where there is an error in unbalance position (angle) due to various factors including the erroneous setting as shown in the part "b" or "c" of FIG. 4, the unbalance correction is carried out at an incorrect position, as shown in FIG. 5c or 5d. This will be described in detail hereinafter.

Results shown in FIG. 5c are generated when there is an error in unbalance correction position, and the correction amount is less than the unbalance amount. Although the initial unbalance position is the position of 0°, as shown in FIG. 5a, an angular error may occur due to a composite reason, as shown in the part "B-1" or "C-1" of FIG. 5c. In this case, the unbalance correction is carried out in accordance with a correction angle and correction amount vector-calculated based on the measured unbalance amount and the erroneous angle as shown in the part "B-1" or "C-1" of FIG. 5c. In the cases respectively shown in the parts "B-1" to "B-3" and "C-1" to "C-3" of FIG. 5c, their angular errors (angular deviations) have relations of "B-1<B-2<B-3" and "C-1<C-2<C-3" with respect to 0°. That is, the case "B-2" has an angular deviation toward 270° larger than that of the case "B-1", and the case "B-3" has an angular deviation toward 270° larger than that of the case "B-2". On the other hand, the case "C-2" has an angular deviation toward 90° larger than that of the case "C-1", and the case "IC-3" has an angular deviation toward 90° larger than that of the case "C-2".

Results shown in FIG. 5d are generated when there is an error in unbalance correction position, and the correction amount is more than the unbalance amount. Although the initial unbalance position is the position of 0°, as shown in FIG. 5a, an angular error may occur due to a composite reason, as shown in the part "D-1" or "E-1" of FIG. 5d. In this case, the unbalance correction is carried out in accordance with a correction angle and correction amount vector-calculated based on the measured unbalance amount and the erroneous angle as shown in the part "D-1" or "E-1" of FIG. 5d. In the cases respectively shown in the parts "D-1" to "D-3" and "E-1" to "E-3" of FIG. 5d, their angular errors (angular deviations) have relations of "D-1<D-2<D-3" and "E-1<E-2<E-3" with respect to 0°. That is, the case "ID-2" has an angular deviation toward 270° larger than that of the case "D-1", and the case "D-3" has an angular deviation toward 270° larger than that of the case "D-2". On the other hand, the case "D-2" has an angular deviation toward 90° larger than that of the case "D-1", and the case "D-3" has an angular deviation toward 90° larger than that of the case "D-2".

When the unbalance compensation is inaccurately achieved, as mentioned above, there is a problem in that the probability that the rotor emerging from the balancing machine has a good quality is reduced to 60% or less. Once the primary unbalance correction is made at a certain position, it is impossible to carry out a re-correction at the same position. For this reason, there is a large defective proportion of products. In the case of an additive unbalance correction, there is a problem in that the weight attached to the rotor may be separated from the rotor during the operation of the rotor. Furthermore, there is waste of resources because most of rotors determined to have a poor quality must be disposed of.

In order to reduce the defective proportion of products, a new setting of the balancing machine may be carried out under the condition in which the balancing machine is stopped, in accordance with conventional techniques. Conventionally, the setting of the balancing machine is carried out periodically or whenever it is determined that the rate of products having a poor quality is too high. The adjustment of the cutting depth and axial movement distance of the cutter associated with the setting of the balancing machine is determined only based on the immediate perception of the operator. For this reason, there is a limitation in reducing the rate of products having a poor quality. Moreover, the quality of products is limited. Also, there is a degradation in productivity.

DISCLOSURE OF THE INVENTION

Therefore the present invention has been made in view of the above mentioned problems, and an object of the invention is to provide a method for automatically compensating for an unbalance correction position and correction amount in a balancing machine, which is capable of greatly reducing the rate of products, for example, rotors, having a poor quality due to an erroneous unbalance correction, while achieving a great improvement in productivity.

In accordance with the present invention, this object is accomplished by providing a method for automatically compensating for an unbalance correction position and an unbalance correction amount in a balancing machine, comprising: an unbalance testing procedure for measuring an unbalance amount and an unbalance position of a rotor completing a primary unbalance correction thereof; an initial unbalance amount determining procedure for determining whether or not an initial unbalance amount present before the unbalance correction is not more than a predetermined value corresponding to an unbalance amount correctable by a one-time correction; a counting procedure for incrementing a counted value when it is determined in the initial unbalance amount determining procedure that the initial unbalance amount is not more than the predetermined value; a good-quality determining procedure for determining whether or not the unbalance amount measured in the unbalance testing procedure is more than a reference value for determining whether or not the rotor has a good quality; an angular deviation measuring procedure for measuring an angular deviation between an unbalance position before the unbalance correction and the unbalance position after the unbalance correction when it is determined in the good-quality determining procedure that the measured unbalance amount is more than the good-quality reference value; an angular deviation range determining procedure for determining whether the angular deviation of the unbalances position measured in the angular deviation measuring procedure is within a range of 0°±X1° (0<X1<5), a range of 180°±X1°, a range of 0°+X2° (X1<X2<90), a range of 180°+X2°, a range 0°−X2°, or a range of 180°−X2°; and an unbalance correction position and amount compensating procedure for, when the counted value reaches a predetermined value for calculation of an average value, comparing the number of times when the angular deviation of the unbalance position is within the range of 0°+X2° or 180°+X2° with the number of times when the angular deviation of the unbalance position is within the range of 0°−X2° or 180°−X2°, angularly compensating for the unbalance corrections position based on the angular deviation of the unbalance position associated with a higher-number one of the compared ranges, comparing the number of times when the angular deviation of the unbalance position is within the range of 0°±X1° in accordance with an insufficient unbalance correction at an accurate correction position with the number of times when the angular deviation of the unbalance position is within the range of 180°±X1° in accordance with an excessive unbalance correction at an accurate correction position, and compensating for the unbalance correction amount in accordance with a higher-number one of the ranges of 0°±X1° and 180°±X1° to increase the unbalance correction amount when the higher-number range is 0°±X1° while reducing the unbalance correction amount when the higher-number range is 180°±X1°.

Preferably, it is determined in the good-quality determining procedure whether or not the rotor has a good quality, based on a value obtained by deducting, from the good-quality reference value, a value optionally set for an improvement in the accuracy of a cutting depth for the unbalance correction.

The automatic compensation method may further comprise a correction amount re-setting procedure for dividing a unbalance amount range measurable prior to the unbalance correction into a plurality of sub-ranges, executing the unbalance testing procedure through the angular deviation range determining procedure for each of the unbalance amount sub-ranges to compare the number of times when the angular deviation of the unbalance position is within the range of 0°±X1° with the number of times when the angular deviation of the unbalance position is within the range of 180°±X1°, and re-setting an unbalance correction amount for the unbalance amount sub-range in accordance with a higher-number one of the ranges of 0°±X1° and 180°±X1°.

The automatic compensation method may further comprise a procedure for displaying a current condition of the balancing machine including a finally determined unbalance position error range, a rate of products having a good quality, and a correction amount error, and a procedure for automatically stopping an operation of the balancing machine in accordance with a self determination of the balancing machine when a current machine condition value reaches a predetermined value at which it is impossible for the balancing machine to operate, and warning an operator of the current machine condition.

The compensation for the unbalance correction position in the unbalance correction position and amount compensating procedure may be carried out by correcting only the unbalance correction amount.

The compensation for the unbalance correction position in the unbalance correction position and amount compensating procedure may carried out by correcting both the unbalance correction position and the unbalance correction amount based on a value obtained by vector-calculating the measured unbalance position and unbalance amount.

Alternatively, the compensation for the unbalance correction position in the unbalance correction position and amount compensating procedure may be carried out by repeatedly performing the unbalance correction under condition in which the unbalance correction position is optionally shifted with reference to 0° or 180°, storing a correction rate at every unbalance correction, calculating a maximum one of stored correction rates, and correcting the unbalance correction position based on the calculated maximum correction rate.

The automatic compensation method may further comprise a basic data storing procedure for storing, as basic data, cutting data exhibiting a predetermined high correction rate or more so that the basic data is used as recovery data when a degradation in correction rate occurs, and an automatic basic data recovering procedure for automatically recovering the stored basic data as cutting data when the correction rate is reduced to a predetermined value.

BRIEF DESCRIPTION OF THE DRAWINGS

The above object, and other features and advantages of the present invention will become more apparent after a reading of the following detailed description when taken in conjunction with the drawings, in which:

FIGS. 5b to 5d are views respectively illustrating examples of an erroneous unbalance correction in conventional cases;

FIGS. 8a to 8c are flow charts illustrating a method for automatically compensating for an unbalance correction position and correction amount in the balancing machine according to the present invention;

BEST MODE FOR CARRYING OUT THE INVENTION

Now, preferred embodiments of the present invention will be described in detail with reference to the annexed drawings.

Figure 1A:
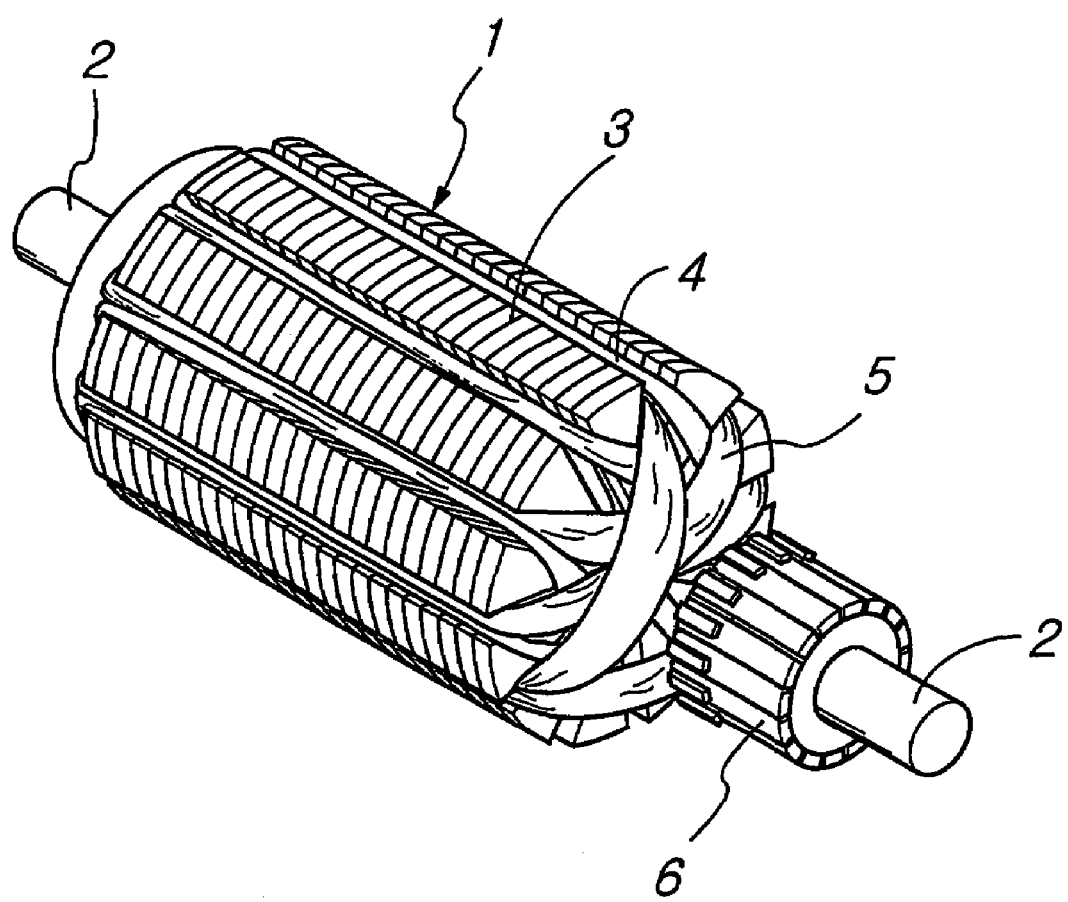
FIGS. 1a and 1b are perspective views respectively illustrating general armatures.
Figure 1B:
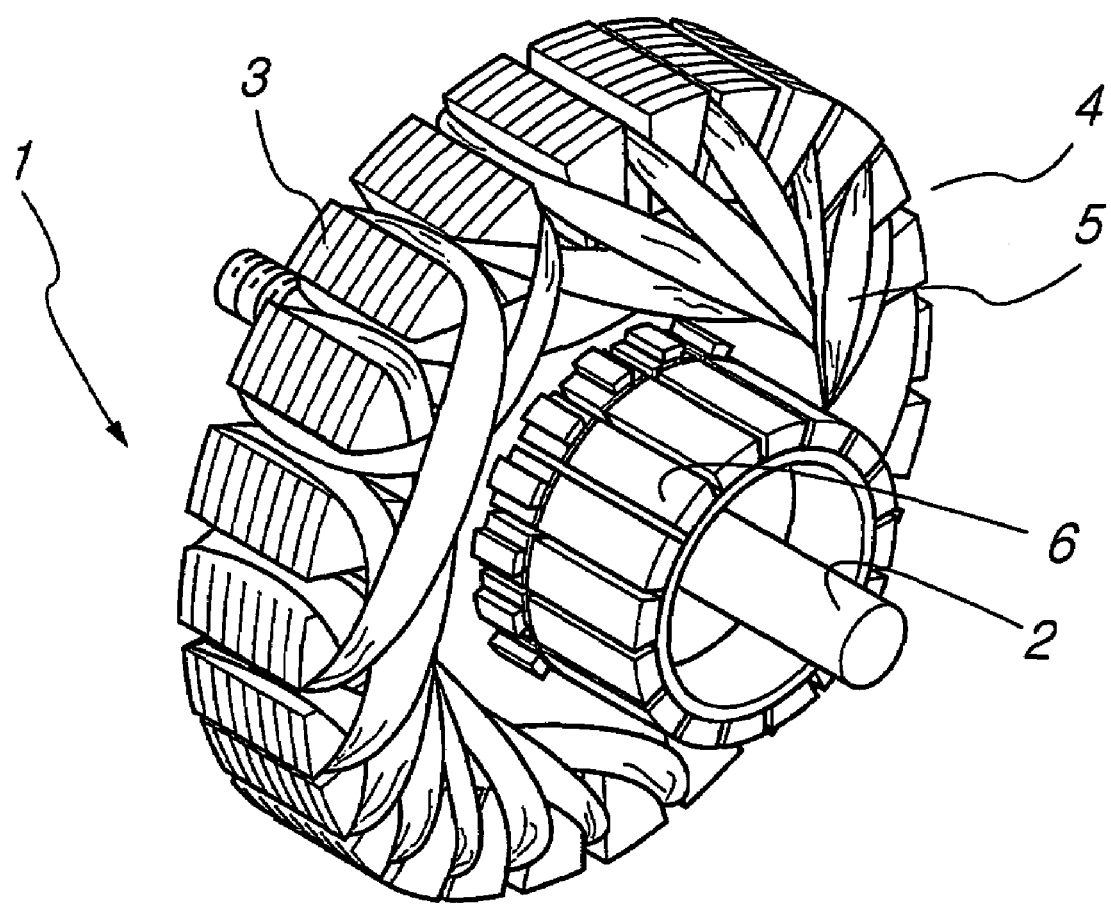
Figure 2A:
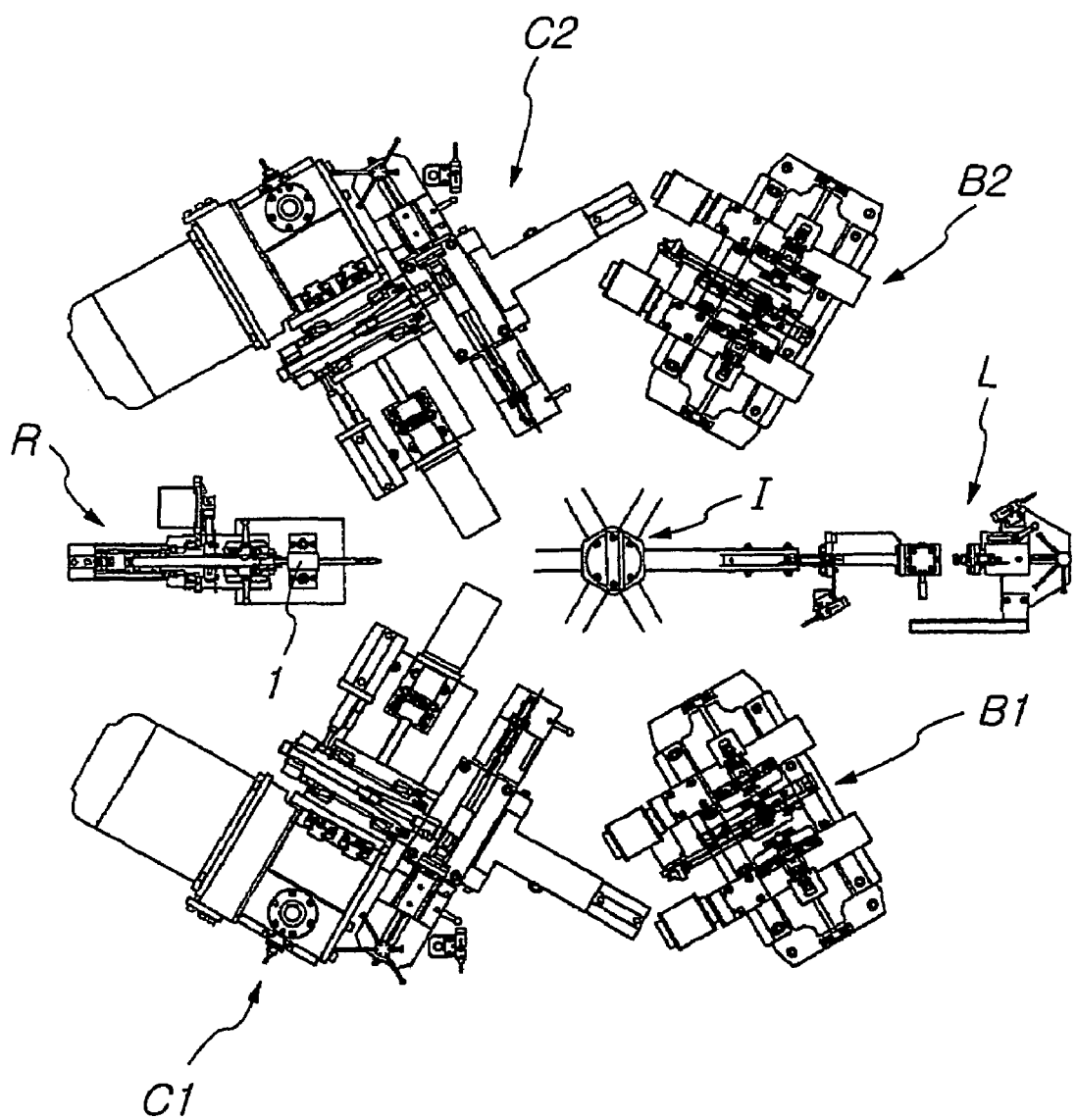
FIG. 2a is a plan view illustrating a conventional 6-axis armature balancing machine.
Figure 2B:
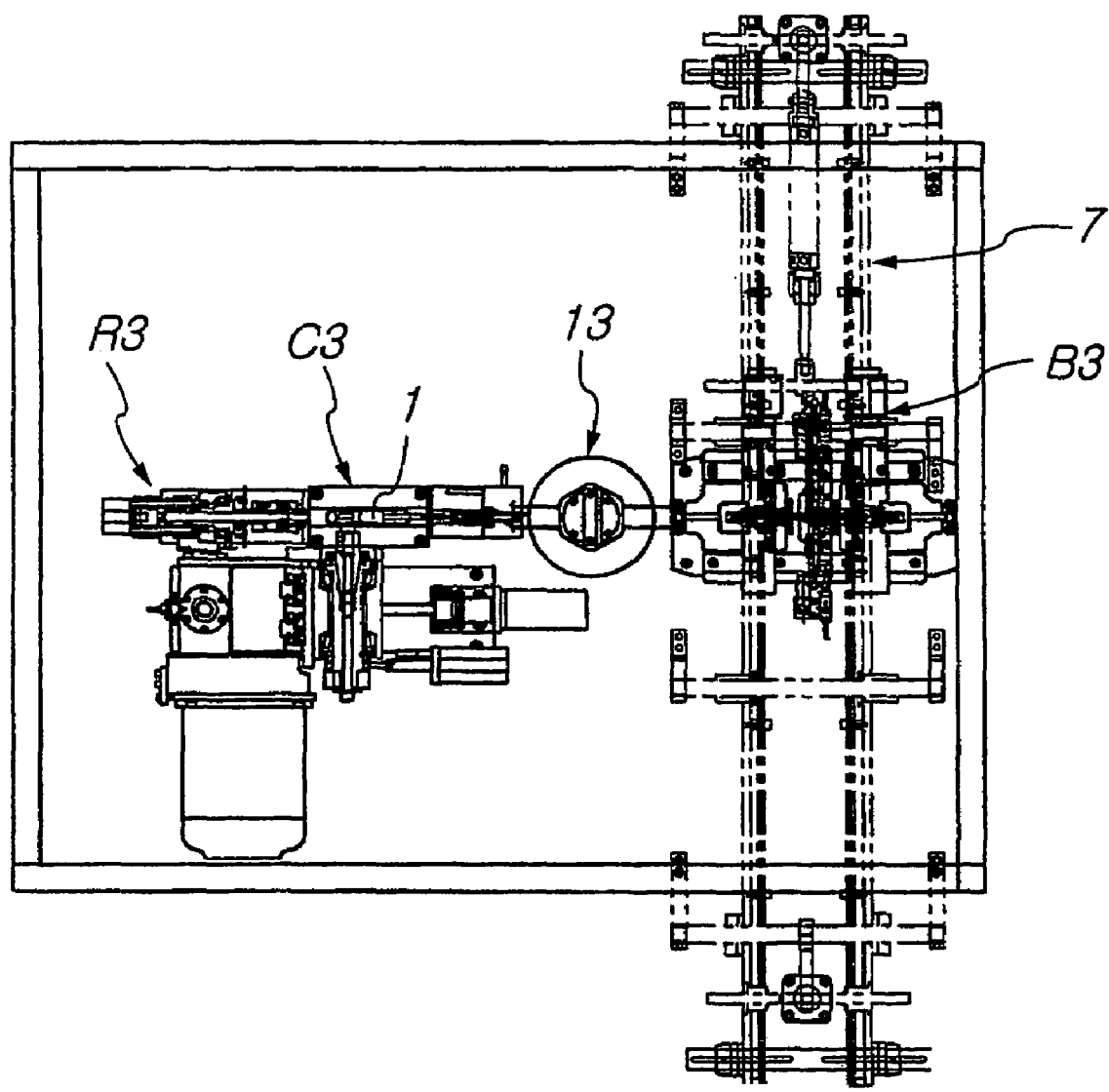
FIG. 2b is a plan view illustrating a conventional 2-axis armature balancing machine.
Figure 3:
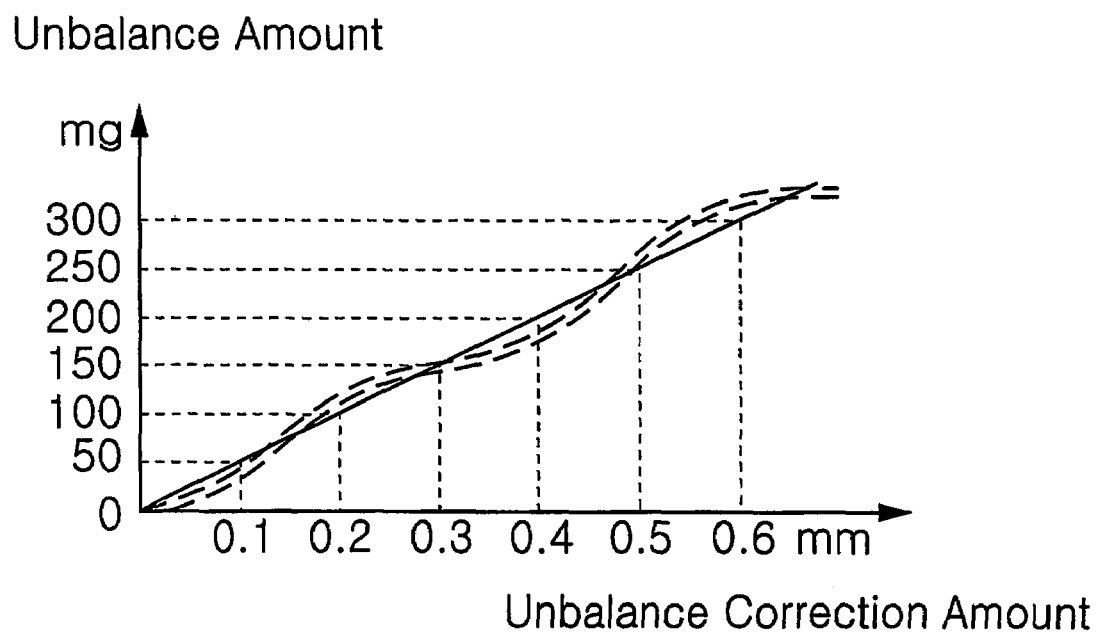
FIG. 3 is a graph depicting an unbalance correction amount varying depending on an unbalance amount in a conventional balancing machine.
Figure 4:
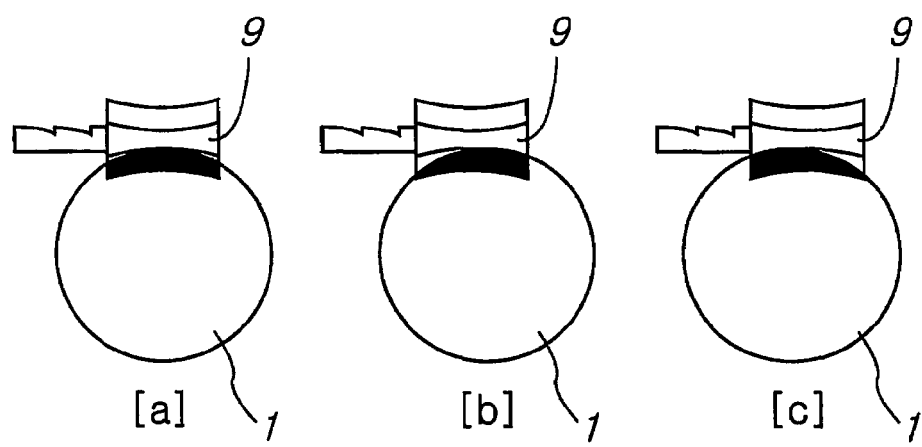
FIG. 4 is a view illustrating examples of an erroneous unbalance correction caused by setting errors in a cutting tool in conventional cases.
Figure 5A:
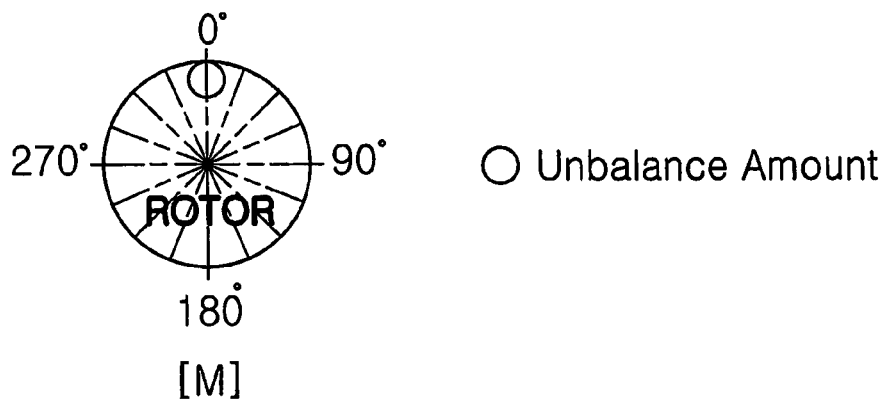
FIG. 5a is a view illustrating a master unbalance position and amount.
Figure 5B:
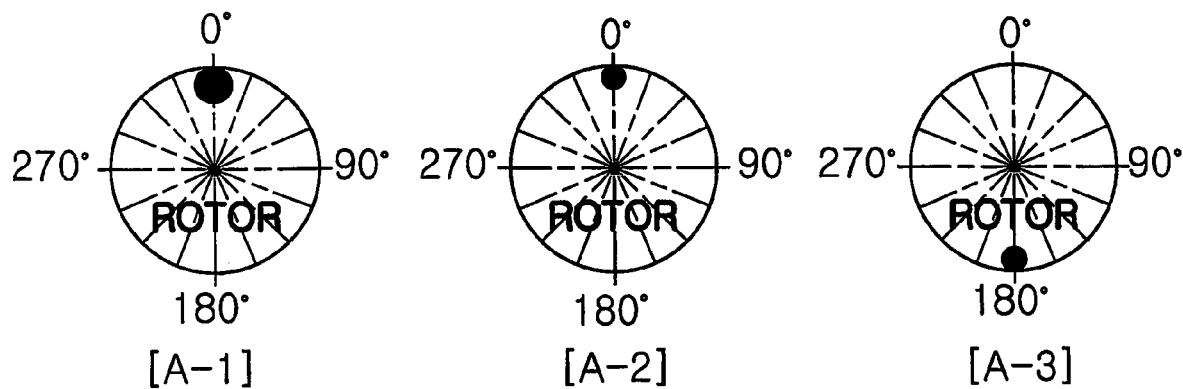
Figure 6A:
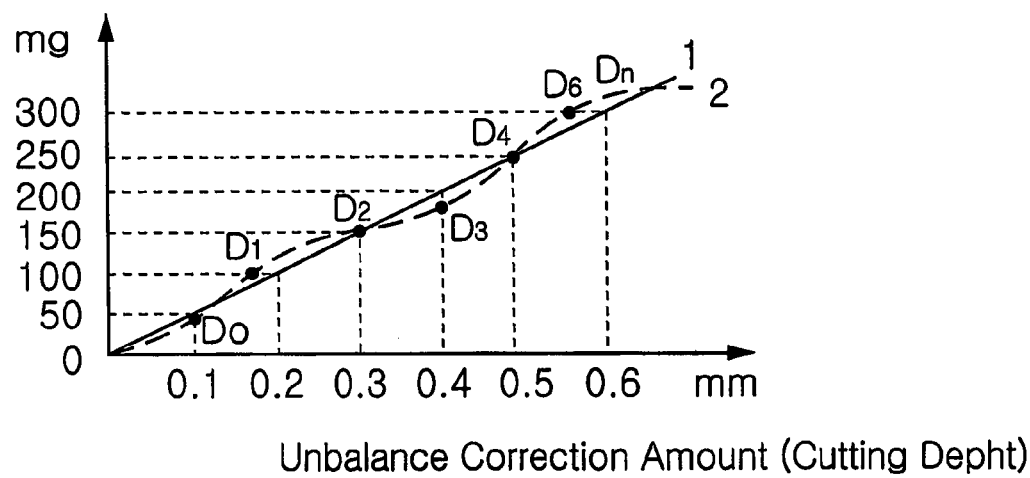
FIGS. 6a and 6b are graphs each depicting the relation between an unbalance amount and a correction amount in a balancing machine according to the present invention.
Figure 6B:
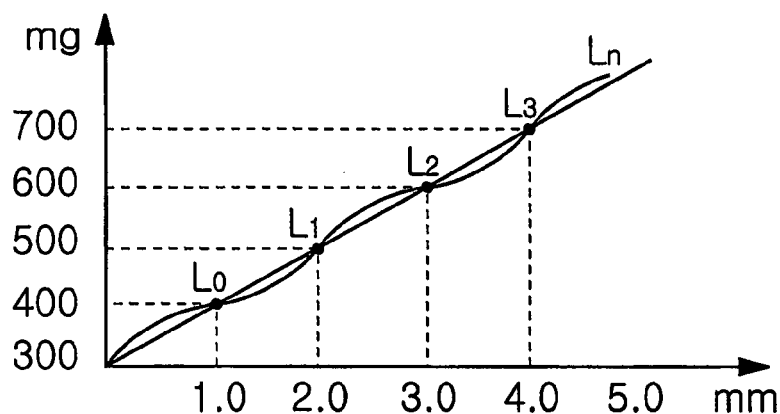
Figure 7:
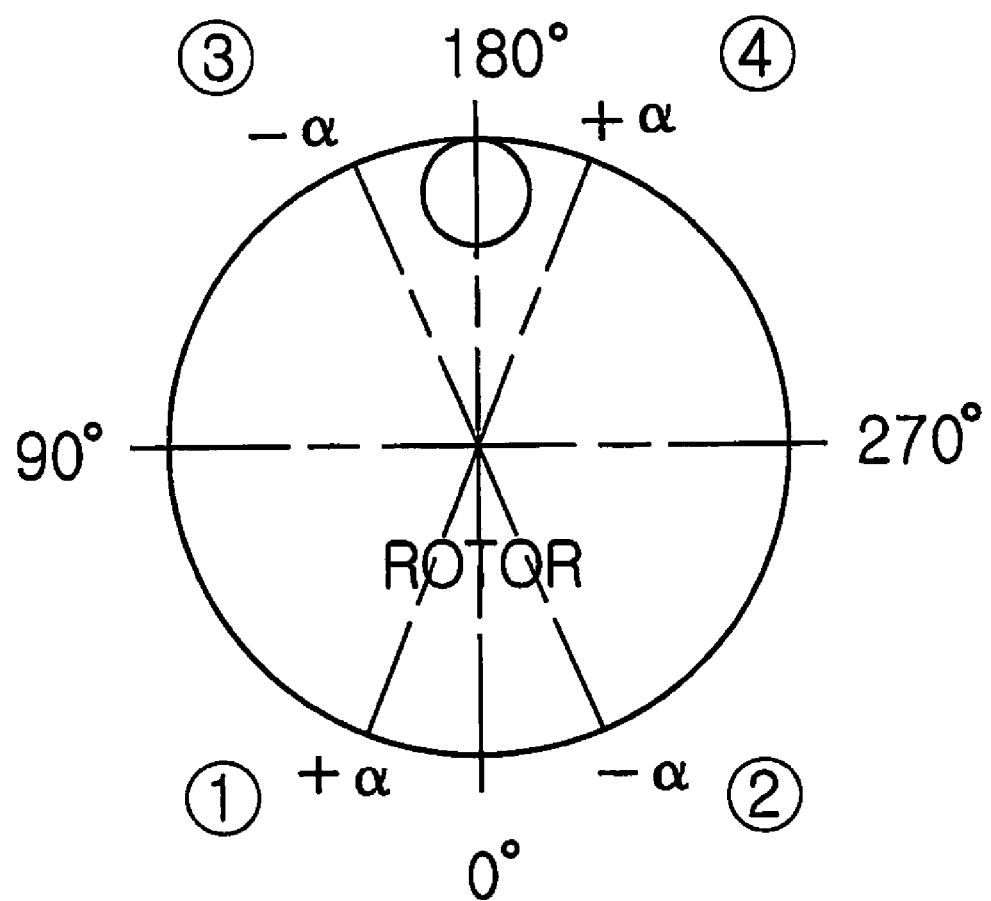
FIG. 7 is a diagram for calculating angular deviations.
Figure 9:
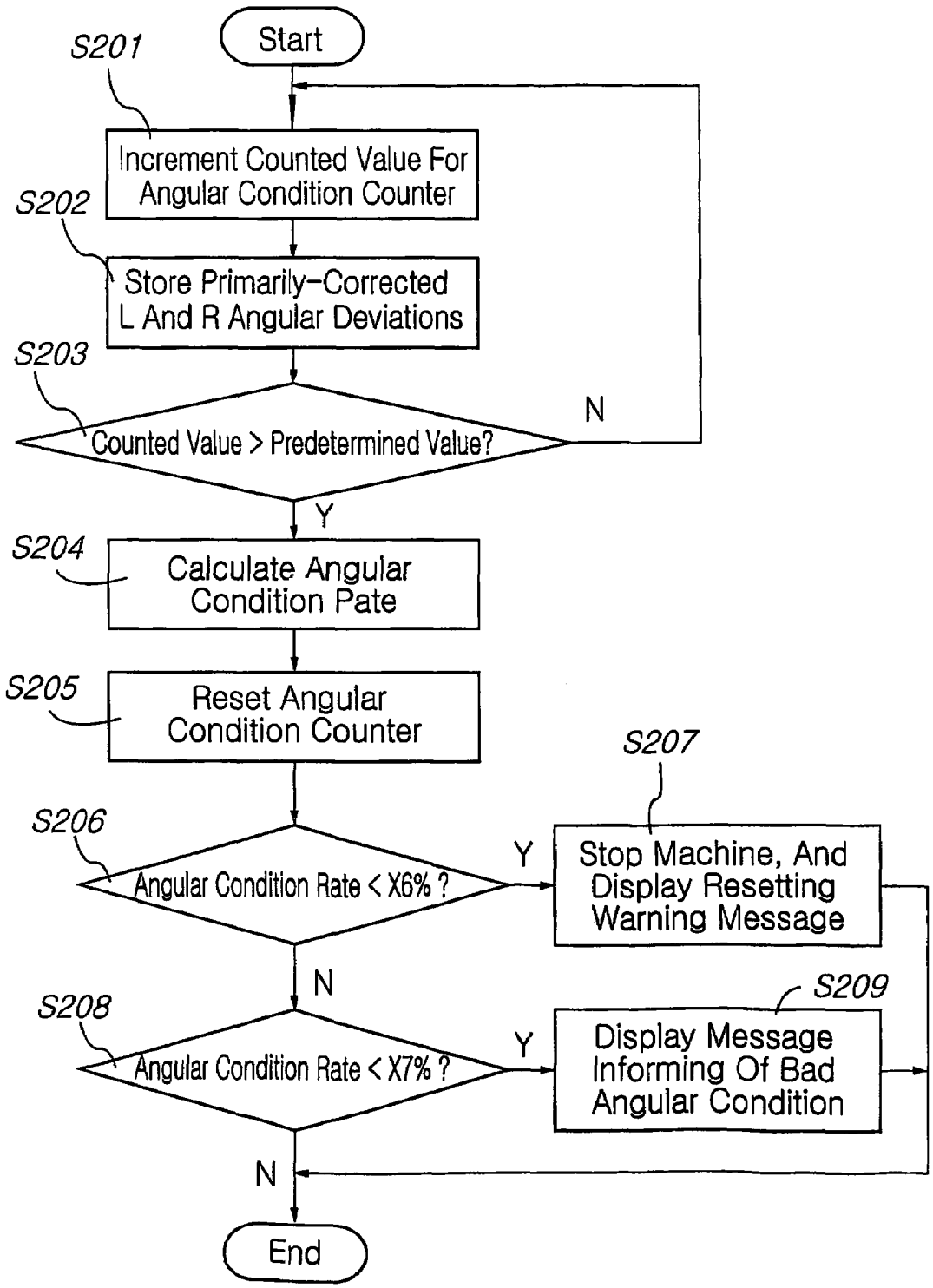
FIG. 9 is a flow chart illustrating an angular condition display procedure according to the present invention.
Figure 10:
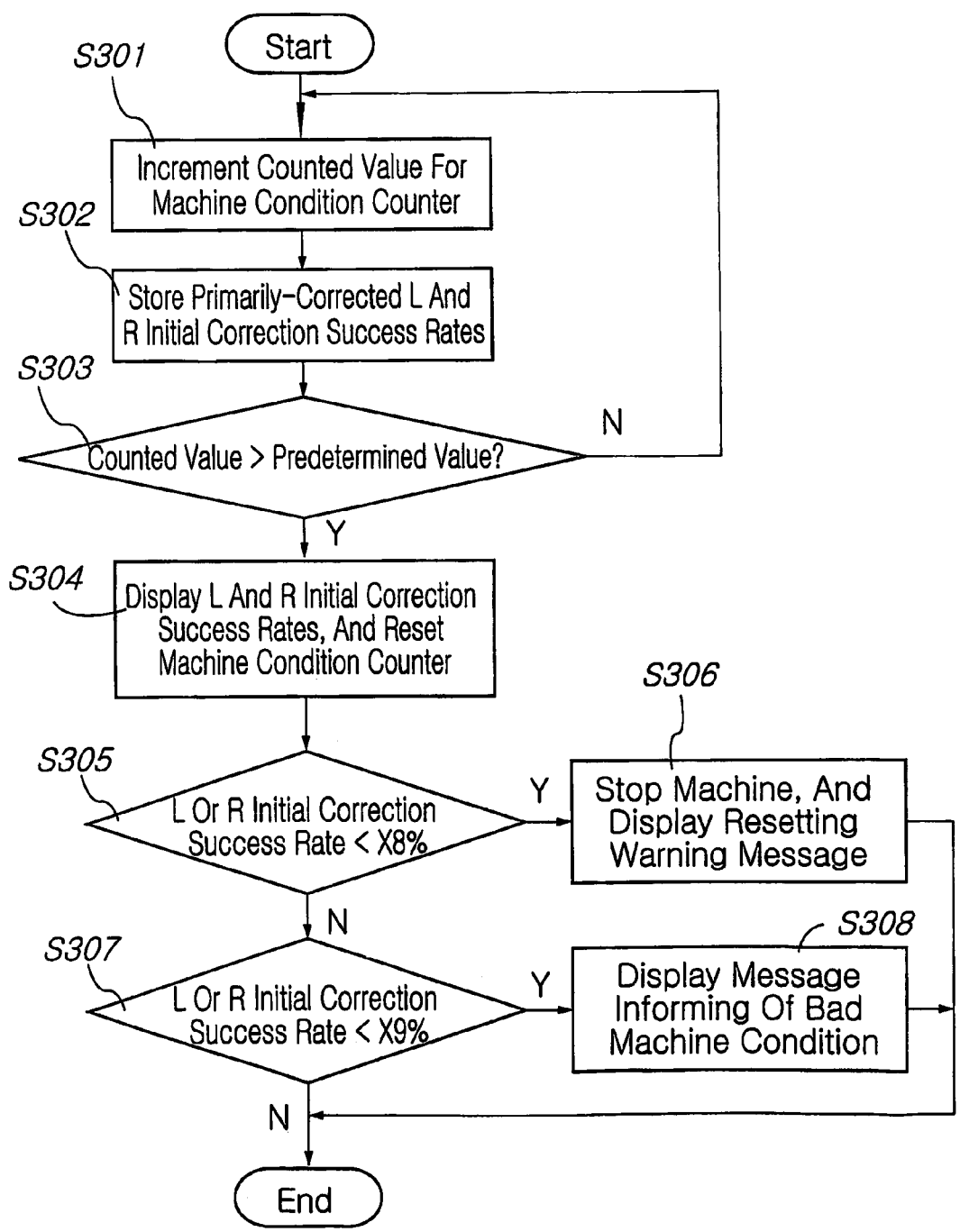
FIG. 10 is a flow chart illustrating a machine condition display procedure according to the present invention.

FIGS. 6a and 6b are graphs each depicting the relation between an unbalance amount and a correction amount (depth and length) in a balancing machine according to the present invention. FIG. 7 is a diagram for calculating angular deviations. FIGS. 8a to 8c are flow charts illustrating a method for automatically compensating for an unbalance correction position and correction amount in the balancing machine according to the present invention. FIG. 9 is a flow chart illustrating an angular condition display procedure according to the present invention. FIG. 10 is a flow chart illustrating a machine condition display procedure according to the present invention.

The method for automatically compensating for the unbalance correction position and unbalance correction amount in the balancing machine according to the present invention involves:

an unbalance testing procedure for measuring the unbalance amount and :,unbalance position of a rotor completing its primary unbalance correction;

an initial unbalance amount determining procedure for determining whether or not the unbalance amount present before the unbalance correction is not more than a predetermined value corresponding to an unbalance amount determined by the operator to be correctable by a one-time correction;

a counting procedure for incrementing a counted value when it is determined in the initial unbalance amount determining procedure that the initial unbalance amount is not more than the predetermined value;

a good-quality determining procedure for determining whether or not the unbalance amount measured in the unbalance testing procedure is more than a reference value for determining whether or not the rotor has a good quality (hereinafter, the reference value is referred to as a "good-quality reference value");

an angular deviation measuring, procedure for measuring an angular deviation between the unbalance position before the unbalance correction and the unbalance position after the unbalance correction when it is determined in the good-quality determining procedure that the measured unbalance amount is more than the good-quality reference value;

an angular deviation range determining procedure for determining whether the angular deviation of the unbalance position measured in the angular deviation measuring procedure is within a range of $0°±X1°$ ($0<X1<5$), a range of $180°±X1°$, a range of $0°+X2°$ (X2 is a maximum correctable angular unbalance error value, and $X1<X2<90$), a range of $180°+X2°$, a range $0°-X2°$, or a range of $180°-X2°$; and an unbalance correction position and amount compensating procedure for, when the counted value reaches a predetermined value for calculation of an average value, comparing the number of times when the angular deviation of the unbalance position is within the range of $0°+X2°$ or $180°+X2°$ with the number of times when the angular deviation of the unbalance position is within the range of $0°-X2°$ or $180°-X2°$, angularly compensating, for the unbalance correction position based on the angular deviation of the unbalance position associated with a higher-number one of the compared ranges, comparing the number of times when the angular deviation of the unbalance position is within the range of $0°±X1°$ in accordance with an insufficient unbalance correction at an accurate correction position with the number of times when the angular deviation of the unbalance position is within the range of a range of $180°±X1°$ in accordance with an excessive unbalance correction at an accurate correction position, and compensating for the unbalance correction amount in accordance with a higher-number one of the ranges of $0°±X1°$ and $180°±X1°$ to increase the unbalance correction amount when the higher-number range is $0°±X1°$ while reducing the unbalance correction amount when the higher-number range is $180°±X1°$.

In the unbalance correction position and amount compensating procedure, the compensation for the correction position is carried by correcting only the unbalance correction amount correcting both the unbalance correction position and amount based on the vector-calculated unbalance correction position and amount, or repeatedly performing the correction under condition in which the correction position is optionally shifted with reference to 0° or 180°, storing the correction rates, calculating the maximum one of the correction rates, and correcting the unbalance correction position based on the calculated maximum correction rate.

In the method for automatically compensating for the unbalance correction position and correction amount in the balancing machine according to the present invention, the compensation for the unbalance amount may be carried out in a subtractive fashion or in an additive fashion. In accordance with the subtractive compensation, the unbalance amount is corrected by partially cutting a heavier portion of the rotor. In accordance with the additive compensation, the unbalance amount is corrected by adding a weight to a lighter portion of the rotor. Therefore, the correction of the unbalance amount should be carried out in an appropriate manner determined in accordance with the used compensation method. This will be described in detail hereinafter. When the result of a re-measurement conducted following the unbalance correction corresponds to $0°±X1°$ under the condition in which the unbalance correction position is 0°, that is, the heavier portion of the rotor is positioned at 0° in the case of the subtractive unbalance correction, it is necessary to increase the cutting depth or axial movement distance of the cutter because the rotor is insufficiently cut. Primarily, the cutting depth is appropriately increased. When the compensation for the unbalance amount by the increase in cutting depth is insufficient, the axial movement distance of the cutter is then increased. When the result of the re-measurement corresponds to $180°±X1°$, it is necessary to reduce the cutting depth or axial movement distance of the cutter because the rotor is excessively cut. On the other hand, when the result of the re-measurement corresponds to $0°±X1°$ in the case of the additive unbalance correction, it is necessary to reduce the weight compensation amount because the weight compensation is excessive. When the result of the re-measurement in the case of the additive unbalance correction corresponds to $180°±X1°$, it is necessary to increase the weight compensation amount because the weight compensation is insufficient.

In the good-quality determining procedure, it is determined whether or not the rotor has a good quality, based on a value obtained by deducting, from the good-quality reference value, a value optionally set by the operator for an improvement in the accuracy of the cutting depth.

In accordance with the method for automatically compensating for the unbalance correction position and correction amount in the balancing machine according to the present invention, the unbalance amount measurable prior to the unbalance correction is divided into a plurality of ranges. That is, the possible unbalance amount range is divided into a plurality of sub-ranges D0 to Dn or L0 to Ln, as shown in FIG. 6a or 6b. Each unbalance amount range may be subdivided again. For each of the unbalance amount sub-ranges, the unbalance testing procedure through the angular deviation range determining procedure are carried out. In accordance with the present invention, the automatic compensation method further involves a correction amount re-setting procedure for comparing the angular deviation of $0°±X1°$ and the angular deviation of $180°±X1°$, and re-setting a desired unbalance correction amount (depth and length) based on the unbalance amount associated with the angular deviation determined to occur more frequently. The unbalance amount and the unbalance correction amount for the unbalance amount, which are initially set in the balancing machine, are proportional to each other in such a fashion that the correction depth or length is linearly proportional to the unbalance amount, as indicated by the line 1 in FIG. 6a or 6b. However, the unbalance amount and the unbalance correction amount have a non-linear relation in practical cases-due to various factors such as various machine conditions, as indicated by the line 2 in FIG. 6a or 6b. In accordance with the present invention, therefore, the unbalance correction amount is accurately and automatically re-set in the above described re-setting procedure, based on the generated error, so that the relation between the unbalance amount and the unbalance correction amount is corrected from that of the line 1 in FIG. 6a or 6b to that of the line 2 in FIG. 6a or 6b. Accordingly, the defective proportion of products is greatly reduced. Heretobefore, the subtractive unbalance correction has been described in conjunction with FIGS. 6a and 6b. The additive unbalance correction may be carried out in the same manner as that of the subtractive unbalance correction, except that the discharge time and pressure of a weight is controlled. Accordingly, no description and illustration will be given in conjunction with the additive unbalance correction.

The method for automatically compensating for the unbalance correction position and correction amount in the balancing machine according to the present invention further involves a procedure for displaying the current condition of the balancing machine including the finally determined unbalance position error range (that is, angular condition rate), the rate of products having a good quality, and the correction amount error, and a procedure for automatically stopping the operation of the balancing machine in accordance with a self determination of the balancing machine when the current machine condition value reaches a predetermined value at which it is impossible for the balancing machine to operate, and warning the operator of the current machine condition. Based on the displayed current machine condition, the operator optionally stops the balancing machine to check it. Even when no machine checking is carried out by the operator, the balancing machine automatically determines whether or not the current machine condition is poor, that is, capable of producing defective products. When it is determined that the current machine condition is poor, that is, capable of producing defective products, the balancing machine informs the operator of the problematic machine condition by displaying a warning sign or generating a buzz, or stops by itself, thereby avoiding an erroneous unbalance correction caused by an erroneous operation of the balancing machine. If there is no function of displaying the current machine condition or of appropriately stopping the balancing machine, it is impossible to determine whether or not the balancing machine operates erroneously even when the operator continuously monitors the current machine condition. The operator can check the erroneous operation of the balancing machine, only after monitoring generation of defective products. When the erroneous operation of the balancing machine is continuously carried out, the rate of products having a good quality after the balance correction is considerably lowered. Consequently, the rate of products having a good quality may reach 0%.

The cutting data may have errors when the automatic compensation for the cutting depth is erroneously made due to defects present at products themselves, setting errors occurring in measuring parts, setting errors generated by the operator. In this case, therefore, it is desirable to recover the erroneously compensated cutting data to the original data. To this end, the method for automatically compensating for the unbalance correction position and unbalance correction amount in the balancing machine according to the present invention further involves a basic data storing procedure for storing, as basic data, cutting data exhibiting a high correction rate of, for example, 97% or more so that the basic data is used as recovery data when a degradation in correction rate occurs. The correction rate may be calculated for a desired number of products, for example, 50 products. Also, the method for automatically compensating for the unbalance correction position and unbalance correction amount in the balancing machine according to the present invention further involves an automatic basic data recovering procedure for automatically recovering the stored basic data as cutting data when the correction rate is reduced to a predetermined value, for example, 90% or less. When the automatic basic data recovering procedure is repeated a predetermined number of times or more, for example, two times or more, an error message is displayed, and the balancing machine is stopped.

Meanwhile, the reason why the range of ±X1° is involved with the measurement of the angular deviation is that the unbalance point cannot be positioned at 0° or 180° due to errors present in the balancing machine itself.

The angular condition rate ACR can be derived using the following Expression 1. The angular error in Expression 1 can be calculated as follows: where the unbalance position measured to have an unbalance angle D after the one-time unbalance correction is positioned at a point ① (0<D<X2), as shown in FIG. 7, the angular error α corresponds to the measured angle, that is, D°; where the unbalance position measured after the one-time unbalance correction is positioned at a point ② (D<360−X2), the angular error a corresponds to a value obtained by deducting 360° from the measured angle of D°; where the unbalance position measured after the one-time unbalance correction is positioned at a point ③ (180−X2<D<180), the angular error a corresponds to a value obtained by deducting 180° from the measured angle of D°; and where the unbalance: position measured after the one-time unbalance correction is positioned at a point ④ (180<D<180+X2), the angular error α corresponds to a value obtained by deducting 180° from the measured angle of D°

$$ACR = \frac{100 \times \frac{|\text{Average Value of Angular Error}| + |\text{Standard Deviation of Angular Error}|}{2}}{X2} \quad [\text{Expression 1}]$$

Now, the preferred embodiment of the present invention having the above described features will be described in detail with reference to FIGS. 8a to 10. The illustrated embodiment of the present invention is associated with the case in which unbalance correction is carried out in a subtractive fashion for respective left and right axial portions of a general rotor. Accordingly, the correction of an unbalance correction amount corresponds to the correction of a cutting depth. The compensation for the unbalance correction amount may be achieved by correcting only the cutting depth or the cutting length, or correcting both the cutting depth and the cutting length, as will be appreciated by those skilled in the technical field. Accordingly, only the method associated with the correction of the cutting depth will be described.

The additive unbalance correction may be carried out in the same manner as that of the subtractive unbalance correction, except that the weight (discharge time and pressure) is controlled in place of the cutting depth or length. Accordingly, no description or illustration will be given in conjunction with the additive unbalance correction.

FIGS. 8a to 8c are flow charts illustrating sequential steps of the method for automatically compensating for the unbalance correction position and correction amount in the balancing machine according to the present invention. FIG. 9 is a flow chart illustrating the angular condition displaying procedure according to the present invention. FIG. 10 is a flow chart illustrating the machine condition displaying procedure according to the present invention. The method of the present invention will be described in more detail with reference to FIGS. 8a to 10 in conjunction with the case wherein an armature is corrected for its unbalance in a subtractive fashion under the condition in which its unbalance correction position is 0°.

In accordance with the method of the present invention, the initial unbalance position and unbalance amount of an armature are primarily measured (Step S100). After completing an unbalance correction at both the left and right portions L and R of the armature (Step S101), the unbalance position and unbalance amount of the armature are measured again (Step 102). It is then determined whether or not the unbalance amount present at each of the left and right armature portions L and R before the unbalance correction, that is, the initial unbalance amount, is more than a predetermined value X3 corresponding to an unbalance amount determined to be correctable by a one-time correction (Step S103).

The predetermined value X3 used in step S103 is optionally set by the operator. Where the initial unbalance amount at each of the left and right armature portions L and R is more than the predetermined value X3, the procedure is returned to step S100 for a secondary unbalance correction because the unbalance at the left or right armature portion L or R cannot be corrected by a one-time correction.

On the other hand, where the initial unbalance amount at each of the left and right armature portions L and R is not more than the predetermined value X3, an incrementation in counted value by one is carried out (Step S104). An angular deviation between the unbalance position measured at step S102 and the unbalance position measured before the unbalance correction is calculated (Step S105). Based on the calculated angular deviation, errors in the unbalance position and depth are determined. This determination will be described in detail hereinafter.

First, it is determined whether or not the unbalance amount measured at the left armature portion L is more than a reference value X4 (Step S106). The reference value X4 is obtained by deducting a predetermined value from a value corresponding to a good quality. When the left unbalance amount is more than the reference value X4, it is determined whether or not the angular deviation between the unbalance position measured before the unbalance correction and the unbalance position measured after the unbalance correction corresponds to $0°\pm X1°$ ($0<X1<5$) (Step S107). When the angular deviation corresponds to $0°\pm X1°$, that is, when the unbalance position measured after the one-time unbalance correction corresponds to $0°\pm X1°$ in the case in which the initial unbalance position is set to be $0°$, the counted value of a plus counter for correction of the left unbalance correction amount is incremented (Step S108). On the other hand, when the angular deviation does not correspond to $0°\pm X1°$, it is then determined whether or not the angular deviation corresponds to $180°\pm X1°$ (Step S109). Where the angular deviation corresponds to $180°\pm X1°$, the counted value of a minus counter for correction of the left unbalance correction amount is incremented (Step S110). On the other hand, where the angular deviation does not correspond to $180°\pm X1°$, it is then determined whether the angular deviation corresponds to $0°-X2°$ or $180°-X2°$ ($X1<X2<90$) (Step S111). When it is determined that the angular deviation corresponds to $0°-X2°$ or $180°-X2°$, the counted value of a plus counter for correction of the left angle deviation is incremented (Step S112). On the other hand, when it is determined that the angular deviation does not correspond to $0°-X2°$ or $180°-X2°$, it is then determined whether the angular deviation corresponds to $0°+X2°$ or $180°+X2°$ (Step S113). When the angular deviation corresponds to $0°+X2°$ or $180°+X2°$, the counted value of a minus counter for correction of the left angle deviation is incremented (Step S114).

Meanwhile, where the angular deviation does not correspond to $0°+X2°$ or $180°+X2°$, it is then determined whether or not the unbalance amount measured at the right armature portion R is more than the reference value X4 (Step S115). When the right unbalance amount is more than the reference value X4, it is determined whether or not the angular deviation between the unbalance position measured before the unbalance correction and the unbalance position measured after the unbalance correction corresponds to $0°\pm X1°$ (Step S116). When the angular deviation corresponds to $0°\pm X1°$, the counted value of a plus counter for correction of the right unbalance correction amount is incremented (Step S117). On the other hand, when the angular deviation does not correspond to $0°\pm X1°$, it is then determined whether or not the angular deviation corresponds to $180°\pm X1°$ (Step S118). Where the angular deviation corresponds to $180°\pm X1°$, the counted value of a minus counter for correction of the right unbalance correction amount is incremented (Step S119). On the other hand, where the angular deviation does not correspond to $180°\pm X1°$, it is then determined whether the angular deviation corresponds to $0°-X2°$ or $180°-X2°$ (Step S120). When it is determined that the angular deviation corresponds to $0°-X2°$ or $180°-X2°$, the counted value of a plus counter for correction of the right angle deviation is incremented (Step S121). On the other hand, when it is determined that the angular deviation does not correspond to $0°-X2°$ or $180°-X2°$, it is then determined whether the angular deviation corresponds to $0°+X2°$ or $180°+X2°$ (Step S122). When the angular deviation corresponds to $0°+X2°$ or $180°+X2°$, the counted value of a minus counter for correction of the right angle deviation, is incremented (Step S123).

Where it is determined at step S106 that the left unbalance amount is not more than the reference value X4, and it is then determined at step 115 that the left unbalance amount is not more than the reference value X4, in accordance with a normal unbalance correction, or where the procedure for determining errors in the unbalance position and depth at both the left and right armature portions is completed, it is determined whether or not the counted value incremented at step S104 reaches a predetermined value X5 optionally set by the operator to obtain an average value (Step S124). When the counted value is less than the predetermined value X5, the procedure is returned to step S100. On the other hand, when the counted value is not less than the predetermined value X5, a procedure for correcting each of the left and right unbalance correction amounts is carried out. This procedure will now be described.

It is first determined whether or not the counted value of the plus counter for correction of the left unbalance correction amount is more than the counted value of the minus counter for correction of the left unbalance correction amount (Step S125). When it is determined that the counted value of the plus counter is more than the counted value of the minus counter, the left unbalance correction amount is increased by a predetermined value (Step S126). This value is optionally set by the operator in accordance with a processing condition, but it is set to be 0.001 mm in accordance with the present invention. On the other hand, when the counted value of the minus counter is not more than the counted value of the plus counter (Step S127), the left unbalance correction amount is reduced by the predetermined value (Step S128).

It is then determined whether or not the counted value of the plus counter for correction of the left angle deviation is more than the counted value of the minus counter for correction of the left angle deviation (Step S129). When it is determined that the counted value of the plus counter is more than the counted value of the minus counter, the cutting position is shifted in a left direction by a compensation angle obtained by vector-calculating the unbalance amount and the unbalance angle (Step S130). On the other hand, when the counted value of the minus counter is more than the counted value of the plus counter (Step S131), the cutting position is shifted in a right direction by the compensation angle obtained by vector-calculating the unbalance amount and the unbalance angle (Step 5132).

After completion of the compensation for the left unbalance, a compensation for the right unbalance is carried out. First, it is determined whether or not the counted value of the plus counter for correction of the right unbalance correction amount is more than the counted value of the minus counter for correction of the right unbalance correction amount (Step S133). When it is determined that the counted value of the plus counter is more than the counted value of the minus counter, the right unbalance correction amount is increased by a predetermined value (Step S134). On the other hand, when the counted value of the minus counter is more than the counted value of the plus counter (Step S135), the right unbalance correction amount is reduced by the predetermined value (Step S128).

It is then determined whether or not the counted value of the plus counter for correction of the right angle deviation is more than the counted value of the minus counter for correction of the right angle deviation (Step S137). When it is determined that the counted value of the plus counter is more than the counted value of the minus counter, the cutting position is shifted in a left direction by a compensation angle obtained by vector-calculating the unbalance amount and the unbalance angle (Step S138). On the other hand, when the counted value of the minus counter is more than the counted value of the plus counter (Step S139), the cutting position is shifted in a right direction by the compensation angle obtained by vector-calculating the unbalance amount and the unbalance angle (Step S140)

After completion of the compensation for both the right and left angle deviations and both the right and left unbalance amounts in accordance with the above described procedure, the counted value at step S104 is reset to be "0" (Step S141). In this state, angular and machine conditions are displayed, respectively (Steps S142 and S143). Thereafter, the entire procedure is repeated. The angular condition displaying procedure and machine condition displaying procedure will now be described in detail with reference to FIGS. 9 and 10.

In the angular condition displaying procedure, the counted value of a counter for angular conditions is incremented in response to the incrementation operation at step S104 in the procedure of FIGS. 8a to 8c (Step S201). The primarily-corrected left and right angular deviations measured at step S102 are stored (Step S202)

Following the storage of the angular deviations, it is determined whether or not the counted value is more than a predetermined value (Step S203). When the counted value is not more than the predetermined value, the procedure is returned to step S201. On the other hand, when the counted value is more than the predetermined value, an angular condition rate is calculated based on the stored angular deviation data in accordance with the Expression 1, and the calculated angular condition rate is displayed (Step S204). Thereafter, the angular condition counter is reset (Step S205).

Subsequently, it is determined whether or not the angular condition rate calculated at step S204 is less than a first predetermined angular condition rate X6% (for example, 50%) (Step S206). Where the calculated angular condition rate is less than the first predetermined angular condition rate, the machine is stopped (Step S207). At step S207, a warning message recommending the operator to re-set the machine is displayed. Thereafter, the procedure is completed. On the other hand, if the calculated angular condition rate is not less than the first predetermined angular condition rate, it is then determined whether or not the calculated angular condition rate is less than a second predetermined angular condition rate X7% (for example, 70%) (Step. S208). Where the calculated angular condition rate is less than the second predetermined angular condition rate X7%, a warning message is displayed which informs the operator of the fact that the current angular condition is bad (Step S209). The procedure is then completed. On the other hand, when the calculated angular condition rate is not less than the second predetermined angular condition rate X7%, procedure is completed.

In the machine condition displaying procedure, the counted value of a counter for machine conditions is incremented in response to the incrementation operation at step S104 in the procedure of FIGS. 8a to 8c (Step S301). Respective initial correction success rates for the left and right portions of the rotor measured at step S102 after the primary unbalance correction are stored (Step S302).

Following the storage of the initial correction success rates, it is determined whether or not the counted value is more than a predetermined value (Step S303). When the counted value is not more than the predetermined value, the procedure is returned to step S301. On the other hand, when the counted value is more than the predetermined value, the left and right initial correction success rates are displayed, and the counter for machine condition is reset. (Step S304).

Subsequently, it is determined whether or not the left or right initial correction success rate displayed at step S304 is less than a first predetermined correction success rate X8% (for example, 50%) (Step S305). When the left or right initial correction success rate is less than the first predetermined correction success rate X8%, the balancing machine is stopped (Step S306). At step S306, a warning message is also displayed to recommend the operator to re-set the balancing machine. The procedure is then completed. On the other hand, when the left and right initial correction success rates are not less than the first predetermined correction success rate X8%, it is determined whether or not the left or right initial correction success rate, is less than a second predetermined correction success rate X9% (for example, 70%) (Step S307). When the left or right initial correction success rate is less than the second predetermined correction success rate X9%, a warning message is displayed to inform the operator of the fact that the current machine condition is bad (Step S308). The procedure is then completed. On the other hand, when the left and right initial correction success rates are not less than the second predetermined correction success rate X9%, the procedure is completed.

Meanwhile, the automatic compensation method for the unbalance correction position and amount described in conjunction with steps S101 to S104 is carried out for the entire unbalance amount range without dividing the unbalance amount range into a plurality of sub-ranges prior to the unbalance correction, in order to compensate for the cutting depth and correction position errors caused by an abrasion of the cutter. Where the unbalance amount is re-set under the condition in which the unbalance amount range is divided into a plurality of sub-ranges, this re-setting may be achieved in the same fashion as the procedures of steps S101 to 141, except that the procedures are sub-divided, and the correction of the angular unbalance position is omitted. Accordingly, no further description will be given in conjunction with the above re-setting procedure.

Although the embodiment of the present invention has been described in conjunction with an armature to be corrected for unbalance at left and right axial portions thereof, the method of the present invention is applicable to unbalance correction for various rotors, as will be appreciated by those skilled in the technical field. Accordingly, no further description will be given.

In accordance with the present invention, it is possible to greatly reduce the defective proportion of products while achieving an enhancement in machining efficiency, and a great increase in productivity because the unbalance correction position and amount of the current rotor are automatically compensated for, based on the correction amount of the previously-corrected rotor, thereby achieving an accurate unbalance correction.

INDUSTRIAL APPLICABILITY

As apparent from the above description, in accordance with the present invention, the unbalance correction position and amount of a rotor is automatically compensated for, based on the unbalance correction amount of a previously-corrected rotor, so as to achieve an optimum unbalance correction in spite of the fact that there may be errors in unbalance correction position and amount due to an erroneous setting of the cutting tool, an abrasion of the blade edge in the cutting tool occurring during its use due to an erroneous setting of the cutting tool, a non-uniform abrasion of the cutting tool, vertical and axial mechanical tolerances occurring during the vertical and axial movements of the index device, a mechanical tolerance caused by a temperature difference, an erroneous measurement of unbalance angle and amount occurring due to a variation in measurement condition caused by an abrasion of the belt or drive pulley, or various angular errors and erroneous operations caused by a variation in time constant occurring due to a variation in the temperature characteristics of various electronic elements. Accordingly, the rate of products having a good quality obtained after a one-time correction in the balancing machine can be 90% or more. Since the balancing machine can maintain a best condition by correcting its condition by itself in accordance with a random variation in machine condition, it is possible to greatly reduce the amount of rotors to be disposed of. Accordingly, it is possible to achieve a considerable increase in productivity without any waste of resources.

In conventional cases, there is a large defective proportion of products because once the primary unbalance correction is made at a certain position, it is impossible to carry out a re-correction at the same position. As a result, there is waste of resources. In the case of a conventional additive unbalance correction, there is an instability in use in that the weight attached to the rotor may be separated from the rotor during the operation of the rotor. However, there is no problem of such as waste of resources in accordance with the present invention because no erroneous unbalance correction occurs.

Since the unbalance correction amount can be re-set under the condition in which it is divided into a plurality of sub-ranges in accordance with the present invention, the balancing machine can be allowed to compensate for randomly-generated mechanical or electrical variations. Accordingly, it is possible to achieve an unbalance correction with an increased accuracy.

In accordance with the present invention, the balancing machine is equipped with functions of monitoring its machine condition, and determining, based on the monitored result, whether the balancing machine operates continuously or displays its machine condition to allow the operator to determine whether the balancing machine should be continuously operated or stopped. Accordingly the operator can always check the condition of the balancing machine. Since the balancing machine is automatically stopped when there are severe errors in the operation of the balancing machine, it is possible to avoid an erroneous unbalance correction caused by errors occurring in the balancing machine.

Conventionally, the operator optionally sets the unbalance correction amount, that is, the cutting depth and axial cutting length in accordance with only his judgment, taking into consideration the unbalance condition exhibited after the unbalance correction. For this reason, where the cutter is replaced by a new one in conventional cases, a lot of time is taken for a setting procedure for obtaining an accurate unbalance correction. In accordance with the present invention, however, it is possible to achieve an accurate unbalance correction within a short period of time after the replacement of the cutter because the balancing machine automatically re-sets the correction amount under a best condition.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for automatically compensating for an unbalance correction position and an unbalance correction amount in a balancing machine, comprising the steps of:
   (1-i) measuring an unbalance amount and an unbalance position of a rotor completing a primary unbalance correction thereof;
   (1-ii) determining whether the initial unbalance amount before the unbalance correction is within the range of set value which is correctable by a one-time correction;
   (1-iii) incrementing counter if it is determined that the initial unbalance amount is within the range of set value in step (ii);
   (1-iv) determining whether the unbalance amount measured in step (i) is larger than a good-quality reference value for determining whether the rotor has a bad quality or good quality;
   (1-v) measuring angular deviation between the unbalance positions of before and after the unbalance correction when the measured unbalance amount is larger than the good-quality reference value in step (1-iv);
   (1-vi) determining whether the angular deviation of the unbalance positions measured in step (1-v) is $0°\pm X1°$ and $180°\pm X1°$ ($0<X1<5$) or $0°+X2°$ and $180°+X2°$ ($X1<X2<90$); and
   (1-vii) compensating unbalance correction position and amount, further comprising the steps of:
   (a) comparing the number of times when the angular deviation of the unbalance position is $0°X2°$ and $180+X2°$ with the number of times when the angular deviation of the unbalance position is $0°-X2°$ and $180°-X2°$ when the counter from step (iii) reaches the value set by an operator for calculation of average value,
   (b) compensating the angle for differences in angular deviation according to the larger number of times in step (a),
   (c) comparing the number of times when the angular deviation of the unbalance position is $0°\pm X1°$ which occurs when insufficient unbalance correction is achieved at an accurate correction position with the number of times when the angular deviation of the unbalance position is $180°\pm X1°$ which occurs when excessive unbalance correction is achieved at an accurate correction position, and
   (d) compensating for the unbalance correction amount by increasing the unbalance correction amount if the number of times for $0°\pm X1°$ is larger or by reducing the unbalance correction amount if the number of times for $180°\pm X1°$ is larger.

2. The method according to claim 1, wherein in step (1-iv), determining the quality of the rotor by subtracting the value optionally set to improve the accuracy of cutting depth from the good-quality reference value for the unbalance correction.

3. The method according to claim 1, further comprising the steps of:
(3-i) dividing an unbalance amount range which is measurable prior to the unbalance correction into a plurality of sub-ranges, (3-ii) executing the steps of (1-i) to (1-vi) for each of the unbalance amount sub-ranges to compare the number of times when the angular deviation of the unbalance position is $0°\pm X1°$ with the number of times when the angular deviation of the unbalance position is $180° \pm X1°$, and (3-iii) re-setting an unbalance correction amount for the unbalance amount sub-range in accordance with the higher number of times in step (3-ii).

4. The method according to claim 1, further comprising:
(4-i) displaying a current condition of the balancing machine including a finally determined unbalance position error range, a rate of products having a good quality, and a correction amount error; and (4-ii) automatically stopping an operation of the balancing machine in accordance with self-determination of the balancing machine when a current machine condition value reaches a predetermined value at which it is impossible for the balancing machine to operate, and warning the operator of the current machine condition.

5. The method according to claim 1, wherein the compensation for the unbalance correction position in step (1-vii) is carried out by correcting only the unbalance correction amount.

6. The method according to claim 1, wherein the compensation for the unbalance correction position in step (1-vii) is carried out by correcting both the unbalance correction position and the unbalance correction amount based on a value obtained by vector-calculating the measured unbalance position and unbalance amount.

7. The method according to claim 1, wherein the compensation for the unbalance correction position in step (1-vii) is carried out by repeatedly performing the unbalance correction under condition in which the unbalance correction position is optionally shifted with reference to 0° or 180°, storing a correction rate at every unbalance correction, calculating a maximum one of stored correction rates, and correcting the unbalance correction position based on the calculated maximum correction rate.

8. The method according to claim 1, further comprising:
storing, as basic data, cutting data exhibiting a predetermined high correction rate or more so that the basic data is used as recovery data when degradation in correction rate occurs.

9. The method according to claim 8, further comprising:
Automatically recovering the stored basic data as cutting data when the correction rate is reduced to a predetermined value.

* * * * *